(12) United States Patent
Smith et al.

(10) Patent No.: US 7,340,001 B2
(45) Date of Patent: Mar. 4, 2008

(54) MULTIDIMENSIONAL SIGNAL MODULATION AND/OR DEMODULATION FOR DATA COMMUNICATIONS

(75) Inventors: Stephen F. Smith, London, TN (US); William B. Dress, Camas, WA (US)

(73) Assignee: UT-Battelle LLC, Oak Ridge, TN (US)

( * ) Notice: Subject to any disclaimer, the term of this patent is extended or adjusted under 35 U.S.C. 154(b) by 651 days.

(21) Appl. No.: 10/726,446

(22) Filed: Dec. 3, 2003

(65) Prior Publication Data

US 2005/0123061 A1    Jun. 9, 2005

(51) Int. Cl.
*H04L 5/12*   (2006.01)
*H04L 5/16*   (2006.01)
*H04L 27/00*  (2006.01)
*H04B 1/00*   (2006.01)
*H04B 7/00*   (2006.01)

(52) U.S. Cl. .................. 375/261; 375/135; 375/136; 375/219; 375/316; 342/361

(58) Field of Classification Search ........ 375/240–296, 375/235, 135, 136, 219, 316; 342/316, 367, 342/378, 383

See application file for complete search history.

(56) References Cited

U.S. PATENT DOCUMENTS

| | | | |
|---|---|---|---|
| 3,475,558 A | 10/1969 | Cahn | |
| 4,084,137 A * | 4/1978 | Welti | ............ 375/260 |
| 4,435,821 A | 3/1984 | Ito et al. | |
| 4,521,878 A | 6/1985 | Toyonaga | |
| 4,550,292 A | 10/1985 | Smith | |
| 5,274,665 A | 12/1993 | Schilling | |
| 5,410,538 A | 4/1995 | Roche et al. | |
| 5,469,469 A | 11/1995 | Haines | |
| 5,521,937 A | 5/1996 | Kondo et al. | |
| 5,539,730 A | 7/1996 | Dent | |
| 5,623,487 A | 4/1997 | Natali | |
| 5,825,257 A * | 10/1998 | Klymyshyn et al. | ........ 332/100 |
| 5,832,044 A * | 11/1998 | Sousa et al. | ............ 375/347 |
| 5,956,345 A | 9/1999 | Allpress et al. | |
| 6,005,886 A | 12/1999 | Short | |
| 6,018,528 A | 1/2000 | Gitlin et al. | |

(Continued)

FOREIGN PATENT DOCUMENTS

EP   0485108   5/1992

(Continued)

OTHER PUBLICATIONS

Biglieri "Digital Modulation Techniques", Chapter 20, 2002 CRC Press.*

(Continued)

*Primary Examiner*—Mohammed Ghayour
*Assistant Examiner*—Sophia Vlahos
(74) *Attorney, Agent, or Firm*—John Bruckner PC

(57) ABSTRACT

Systems and methods are described for multidimensional signal modulation and/or demodulation for data communications. A method includes modulating a carrier signal in a first domain selected from the group consisting of phase, frequency, amplitude, polarization and spread; modulating the carrier signal in a second domain selected from the group consisting of phase, frequency, amplitude, polarization and spread; and modulating the carrier signal in a third domain selected from the group consisting of phase, frequency, amplitude, polarization and spread.

34 Claims, 9 Drawing Sheets

U.S. PATENT DOCUMENTS

| | | | |
|---|---|---|---|
| 6,188,715 | B1 | 2/2001 | Partyka |
| 6,223,053 | B1 | 4/2001 | Friedmann et al. |
| 6,229,796 | B1 | 5/2001 | Dent |
| 6,243,397 | B1 | 6/2001 | Yun |
| 6,289,038 | B1 | 9/2001 | Park |
| 6,614,861 | B1 * | 9/2003 | Terry et al. .................. 375/347 |
| 6,686,879 | B2 * | 2/2004 | Shattil ........................ 342/367 |
| 2002/0034191 | A1 | 3/2002 | Shattil |
| 2003/0123383 | A1 | 7/2003 | Korobkov et al. |
| 2003/0165183 | A1 | 9/2003 | Ketchum |

FOREIGN PATENT DOCUMENTS

| | | |
|---|---|---|
| EP | 1128624 | 8/2001 |
| JP | 11-41204 | 2/1999 |
| WO | WO 00/11823 | 3/2000 |
| WO | WO 01/01584 | 1/2001 |
| WO | WO 02/27992 | 4/2002 |
| WO | WO 03/043235 | 5/2003 |
| WO | WO 2005/025074 | 3/2005 |

OTHER PUBLICATIONS

International Search Report & Written Opinion of the International Searching Authority from PCT/US2004/040732, Jun. 10, 2005.
International Search Report & Written Opinion of the International Searching Authority from PCT/US2004/040754, May 10, 2005.
Ezio Biglieri, "Digital modulation techniques" CRC Press LLC, chapter 20, paragraphs 20.1-20.7., 2002.
Benedetto et al., IEEE Enginers Socledade Brasillera de Telecommunicacoes: "Polarization shift keying: an efficient coherent optical modulation" SBT/IEEE, pp. 0014-0020, Sep. 3, 1990.
International Search Report & Written Opinion of the International Searching Authority from PCT/US2004/040680, Nov. 3, 2005.
Hara et al., "Overview of Multicarrier CDMA" IEEE Communications Magazine, IEEE Service Center, Piscataway, N.J., USA pp. 126-133, Dec. 1997.
Jong et al., "Performance Analysis of coded multicarrier spread-spectrum systems in the presence of multipath fading and nonlinearities", IEEE Transactions on Communications, vol. 49, No. 1, pp. 168-179, Jan. 2001.
Magill, "Multi-carrier modulated orthogonal code-division multiple access (MCM-OCDMA)" in K. Fazel and G.P. Fettweis (eds.) Multi-Carrier Spread-Specturm, Kluwer Academic Publishers, pp. 105-110, 1997.
Harada et al., "Performance analysis of a new multi-code and multi-carrier hybrid transmission scheme for future broadband mobile communication systems" in K. Fazel and G.P. Fettweis (eds.) Multi-Carrier Spread-Spectrum, Kluwer Academic Publishers, pp. 41-48, 1997.
International Search Report for PCT/US01/30421, Sep. 10, 2002.
Yang, et al., "Blind Joint Soft-Detection Assisted Slow Frequency-Hopping Multicarrier DS-CDMA" IEEE Transactions on Communications, vol. 48, No. 9, pp. 1520-1529, Sep. 2000.
Enjia, et al. "The Study of FH/MCFD/SSMA/DPSK Wireless Communication Systems" Department of Electronics, Peking University, International Conference on Communication Technology, pp. S18-06-1 through S18-065, Oct. 22, 1998.
Oh, et al. "The Bandwidth Efficiency Increasing Method of Multi-Carrier CDMA and its Performance Evaluation in comparison with DS-CDMA with Rake Receivers" Department of Information & Communication Engineering, Chonbuk National University, Chonju, Korea, pp. 561-565, May 16, 1999.
Nahier, et al., "Das-Multi-Carrier-Spreizspektrumsystem Helex", vol. 72, No. 16, pp. 78-80, Jul. 23, 1999.
Koulakiotis et al., "Comparative study of interference cancellation schemes in multi-user detection", IEE, 1997, pp. 10/1-10/7.
Ortigoza-Guerrero et al., "A dynamic resource allocation strategy for future UMTS", IEEE, 1998, pp. 377-381.
Azad et al., "Multirate spread spectrum direct sequence CDMA techniques", I$$ 1994, pp. 4/1-4/5.

* cited by examiner

MULTIDIMENSIONAL SIGNAL MODULATION AND/OR DEMODULATION FOR DATA COMMUNICATIONS

STATEMENT AS TO RIGHTS TO INVENTIONS MADE UNDER FEDERALLY-SPONSORED RESEARCH OR DEVELOPMENT

This invention was made with United States Government support under prime contract No. DE-AC05-00OR22725 to UT-Battelle, L.L.C. awarded by the Department of Energy. The Government has certain rights in this invention.

BACKGROUND OF THE INVENTION

1. Field of the Invention

The invention relates generally to the field of communications. More particularly, the invention relates to methods of multidimensional signal modulation and/or demodulation for data communications, and machinery for transmitting and/or receiving such communications.

2. Discussion of the Related Art

Currently available advanced RF modulation schemes in use typically incorporate multistate modulation schemes such as n-QAM, m-ary FSK, or m-ary PSK to accommodate higher rates of data transmission than are possible in standard binary (2-state) signaling techniques such as binary phase-shift keying (BPSK), simple on-off keying (OOK), or standard frequency-shift keying (FSK). The most spectrally efficient and robust techniques for a given modulation density are currently generally agreed in the art to be the rectangular n-QAM (quadrature amplitude modulation) constellations, where in general the number of equally spaced modulation states n is a binary power, $2^k$, where k=2, 3, 4, 5, 6, 7, 8, ... Most often these systems utilize an even binary power, $2^{2k}$, e.g., 4, 16, 64, or 256 modulation states. FIG. 24 shows a conventional constellation for 4-QAM with 2 bits per symbol. This same constellation can represent quadrature phase shift keying (QPSK or 4-PSK).

Theoretically, higher numbers of states are possible, but the practical constraints of required levels of linearity in the modulating circuitry and realizable signal-to-noise ratios (SNRs) in the transmission links and receiving hardware limit most current-day systems to a maximum density of 256 states ("256-QAM"). In addition, other constellation forms such as hexagonal may be useful in establishing more efficient coding schemes (i.e., increasing the mean Euclidean distances between adjacent points in the symbol constellations), although such hexagonal constellations may be more suitable for nonbinary codes (indicies other than two).

Techniques such as Trellis coding have also been employed to increase the effective difference between signal states representing adjacent coded data symbols by re-mapping the standard constellation of FIG. 24 into the modified form of FIG. 25. FIG. 25 shows a conventional constellation for 8-PSK. Note that the respective "Hamming" distances (discretized linear or Euclidean geometric distances between adjacent symbols as represented in the modulation constellations) are increased in the latter, thus realizing improved performance (i.e., lower data error rates for a given SNR condition) by using the Trellis coding.

SUMMARY OF THE INVENTION

There is a need for the following aspects of the invention. Of course, the invention is not limited to these aspects.

According to an aspect of the invention, a process comprises: modulating a carrier signal in a first domain selected from the group consisting of phase, frequency, amplitude, polarization, and spread; modulating the carrier signal in a second domain selected from the group consisting of phase, frequency, amplitude, polarization, and spread; and modulating the carrier signal in a third domain selected from the group consisting of phase, frequency, amplitude, polarization, and spread. According to another aspect of the invention, a process comprises: demodulating a signal in a first domain selected from the group consisting of phase, frequency, amplitude, polarization, and spread; demodulating the signal in a second domain selected from the group consisting of phase, frequency, amplitude, polarization, and spread; and demodulating the signal in a third domain selected from the group consisting of phase, frequency, amplitude, polarization, and spread.

These, and other, aspects of the invention will be better appreciated and understood when considered in conjunction with the following description and the accompanying drawings. It should be understood, however, that the following description, while indicating various embodiments of the invention and numerous specific details thereof, is given by way of illustration and not of limitation. Many substitutions, modifications, additions and/or rearrangements may be made within the scope of the invention without departing from the spirit thereof, and the invention includes all such substitutions, modifications, additions and/or rearrangements.

BRIEF DESCRIPTION OF THE DRAWINGS

The drawings accompanying and forming part of this specification are included to depict certain aspects of the invention. A clearer conception of the invention, and of the components and operation of systems provided with the invention, will become more readily apparent by referring to the exemplary, and therefore nonlimiting, embodiments illustrated in the drawings, wherein identical reference numerals (if they occur in more than one view) designate the same elements. The invention may be better understood by reference to one or more of these drawings in combination with the description presented herein. It should be noted that the features illustrated in the drawings are not necessarily drawn to scale.

DESCRIPTION OF PREFERRED
EMBODIMENTS

The invention and the various features and advantageous details thereof are explained more fully with reference to the nonlimiting embodiments that are illustrated in the accompanying drawings and detailed in the following description. Descriptions of well known processing techniques, components and equipment are omitted so as not to unnecessarily obscure the invention in detail. It should be understood, however, that the detailed description and the specific examples, while indicating preferred embodiments of the invention, are given by way of illustration only and not by way of limitation. Various substitutions, modifications, additions and/or rearrangements within the spirit and/or scope of the underlying inventive concept will become apparent to those skilled in the art from this disclosure.

Within this application several publications are referenced by Arabic numerals within parentheses or brackets. Full citations for these, and other, publications may be found at the end of the specification immediately preceding the claims after the section heading References. The disclosures of all these publications in their entireties are hereby expressly incorporated by reference herein for the purpose of indicating the background of the invention and illustrating the state of the art.

The below-referenced U.S. Patent Applications disclose embodiments that are satisfactory for the purposes for which they are intended. The entire contents of U.S. patent application Ser. No. 10/726,475, filed Dec. 3, 2003 are hereby expressly incorporated by reference herein for all purposes. The entire contents of U.S. patent application Ser. No. 09/671,636, filed Sep. 27, 2000, by William B. Dress, Stephen F. Smith and Michael R. Moore, entitled *Hybrid Spread-Spectrum Technique for Expanding Channel Capacity*, are hereby expressly incorporated by reference herein for all purposes.

The invention can include a signal modulation and encoding and/or demodulation and decoding scheme to provide higher rates of data transmission in RF and optical links than previously achievable by utilizing additional dimension(s) of the transmitted signal space to carry the additional information. Current standard techniques utilize either one or two signal dimensions to code the data for transmission. The invention can incorporate both signal-modulation constellations with one or more additional (i.e., a total of at least 3) dimensions, plus the use of optimized schemes such as Trellis or "turbo" coding adapted to the higher-dimensional signal-modulation spaces to improve overall performance of the link versus noise and/or mutipath or other degradations in signal quality.

Figure 26:
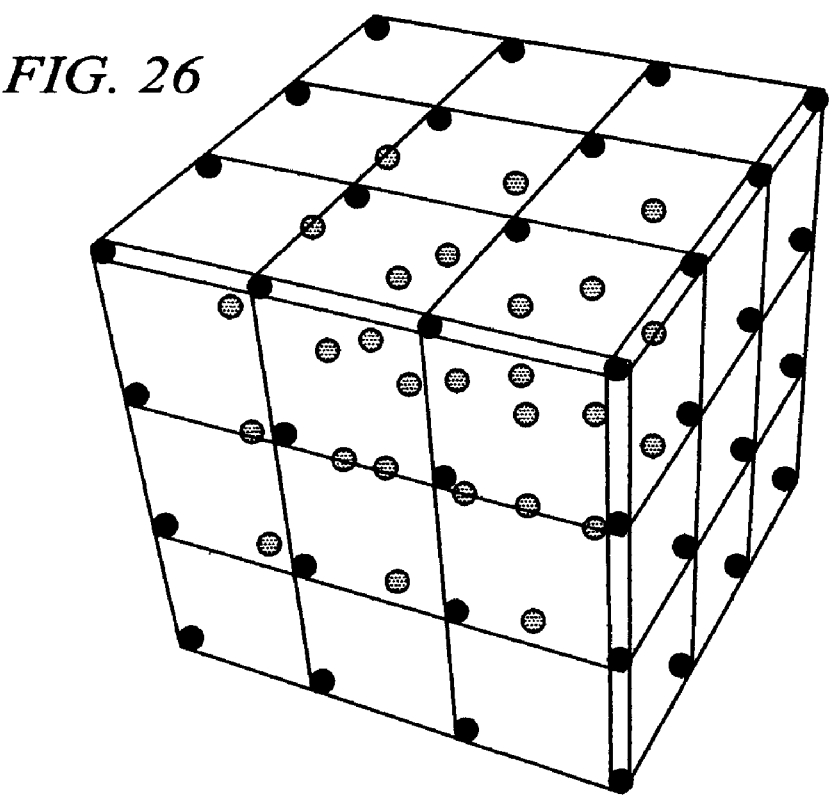
FIG. 26 illustrates a 3-D cubic constellation (4×4×4)=64 states (6 bits per symbol), representing an embodiment of the invention.

FIG. 26 illustrates an embodiment of the invention that includes an additional (third) signal-modulation dimension. Whereas a two-dimensional 4×4 state possesses 16 discrete modulation states (i.e., 16-QAM, with 4 bits per modulation symbol), the three-dimensional 4×4×4 constellation shown in FIG. 3 has 64 states (and thus 6 bits per symbol). The net gain of 2 additional bits per modulation symbol theoretically represents a factor of $2^2$ or 4 improvement in the achievable data rate for the link, compared to the two-dimensional 4×4 state assuming an equivalent signal-to-noise ratio (SNR) characteristic in the additional signal dimension. In FIG. 26, the interior states are shown in gray and only 37 of the 64 states are shown in black on the visible surfaces.

It is important to note that the density gain improvement that can be effected by the invention is much higher starting with a 64-QAM (8×8 state) 2-D case, with 6 bits per symbol. In comparison, the corresponding 3-D signal space yields 8×8×8=512 states, for 9 bits per symbol, or a net gain of 3 bits per symbol (a factor of $2^3$ or 8 improvement). Further, starting with a 2-D 256-QAM format with 8 bits/symbol, the corresponding 3-D 16×16×16 cubic constellation contains 4096 points, for a density of 12 bits/symbol. Here, the mathematical improvement is a factor of 16, or 4 additional bits per modulation symbol.

Now we must consider the choice and implementation of the additional signal-modulation dimension of the invention in practical RF and optical data-transmission hardware systems. One useful (and totally independent) signal property to exploit for this additional modulation dimension is transmitted electromagnetic polarization orientation, i.e., either vertical, horizontal, and/or a combination thereof. In this scenario, since the wave amplitude is significant (for the QAM case), a constant-envelope technique is preferred to modulate the independent signal-polarization dimension. You do not want to incidentally modify the component amplitudes of the QAM waveform. For practical microwave and millimeter-wave RF systems, polarization discriminations of 30 dB are readily achievable; often, optical systems can run better than 40 dB. If we assume a nominal ratio of 30 dB (a factor of 31.6 in amplitude), then it is certainly straightforward to achieve higher data densities by adding 64-PSK (polarization) modulation for the signal-polarization dimension, which requires a minimum of 28.5 dB SNR in a Gaussian-noise dominated channel for a bit-error rate (BER) of $10^{-6}$, and thereby produce an effective modulation density of an additional 6 bits per symbol over that achievable without the additional dimension. Thus, in high-SNR links where 256-QAM modulation (i.e., 8 bits per symbol) is used in the signal-phase domain, which requires a minimum of 24 dB SNR for a Gaussian-noise dominated channel, the addition of the polarization modulation can yield a composite rate of 14 bits/symbol, or a 75% increase in the total signaling rate, per individual carrier frequency. This embodiment of the invention can be termed 256-QAM/64-PSK (polarization shift keying). It should be noted that starting with a QAM modulation format is only one method of improving the bandwidth efficiency in standard links; other starting formats include m-ary PSK, M-FSK, and [multicarrier] orthogonal frequency-division multiplex (OFDM) techniques. QAM is generally considered the most power-efficient bandwidth-limiting coding method, while OFDM is usually thought to exhibit superior robustness to the others in multipath-degraded environments. A shortcoming of the m-ary PSK (polarization) technique for the signal-polarization modulation described above as an example of the invention is the presence of reflections at virtually all possible polarization angles in a typical mobile radio environment which can drastically impair the fidelity of the polarization components of the received signal, thus at times markedly reducing the corresponding advantage in modulation rates achievable compared to the largely benign (multipath-free) stationary LOS (line-of-sight) link scenario.

The invention can include utilization of a fourth dimension of frequency, where the individual frequency channels are mutually orthogonal (e.g., as in the case of OFDM schemes). The total number of possible points in the symbol-modulation constellation for a composite 256-QAM/64-PSK/256-OFDM multicarrier signal set, for the representative parameters just cited, could easily be $16 \times 16 \times 64 \times 256 = 4,194,304 = 2^{22}$, where the basic independent 256-QAM (I/Q) and 64-PSK (polarization) modulations are concurrently performed on the set of 256 orthogonal carriers. Thus, each encoded symbol could represent some 22 bits, all within reasonably achievable channel bandwidth and SNR scenarios!

This document reports on a method of transmitting information at maximum rates on a physically isolated radio-frequency (RF) or optical beam. The main assumption is that a certain frequency band be available and free from external jamming signals. This can be accomplished in a point-to-point situation using high-gain antennas for transmission and reception. Additionally, if the antenna spacing is not too great, the required power can meet the Federal Communications Commission (FCC) regulations for use in the license-free Industrial, Scientific, and Medical (ISM) band limitations.

The solution developed in this document is based on the notion of physical channels defined by frequency and polarization. The concept of symbol capacity is introduced. Symbol capacity (an objective, physical measure) and the usual notions of information capacity are jointly used to ensure optimal system design, minimizing errors and maximizing information rates. Additionally, the idea of a symbol constellation is extended from two to three and four dimensions. This naturally leads to the idea of assigning direct-sequence (or DS) [i.e., spread-spectrum polynomial] codes to constellation points instead of the common practice of assigning codes to states of a single bit.

Orthogonal frequency channels can be defined and distributed evenly throughout the available band, each channel carrying simultaneous amplitude, phase, and polarization information. The invention is materially different from the usual methods of spread-spectrum and code modulation, although it can also make use of these techniques for logically partitioning the band into a large number of virtual users. These virtual channels may be software allocated to any number of physical users.

The invention is robust and adapts gracefully to changes in ambient channel noise, presence of accidental and/or intentional jammers, and varying partial blockage of the beam between or at the antennas. Two schemes are presented for interference adaptation. They are both controlled by software and require minimal communication between transmitter and receiver to establish a set of parameters resulting in an acceptable error rate.

The four concepts (physical channel, symbol capacity, symbol constellation, and orthogonal symbols) introduced below are not restricted to the central problem of tight-beam communications addressed, but are generically applicable to a broad range of communications applications, both in the RF and optical domains. Three of these ideas are presented here for the first time, while that of orthogonal signals is extended beyond its usual domain to cover the distinctions between symbol, channel, chip, and bit orthogonality Theoretical Background Three new concepts are introduced to conceptualize a multidimensional transmission system and aid in the design process. The first concept introduces physical symbol capacity, contrasted with Shannon information capacity. Physical capacity is based on the notion of the physical state of an electromagnetic wave and aids in system design by providing a practical limit on the number of bits per symbol that an information system can profitably employ. The physical state provides a concise and physically meaningful definition of "symbol" in a communication system. The second concept extends the common two-dimensional signal constellation to three and four (and more) dimensions, while precisely describing the optimal density of two-, three-, and four-dimensional probability distributions to achieve bounded-error detection. The third concept defines a composite signal and shows how such entities may be mapped onto constellation points, creating a new type of symbol constellation that extends a system's multiplexing capability as well as provides additional robustness against interference. A fourth concept refines the notion of coded-channel orthogonality to allow channel spacing much closer than the standard reciprocal symbol period.

Introduction

There are two basic methods of frequency spreading using multiple frequency channels: (1) frequency hopping and (2) simultaneous occupancy. In the first method, one and only one channel is active at any one time. The number of channels depends on the available bandwidth and frequency resolution of the receiver. For example, given a 100-MHz bandwidth and a receiver discrimination of 100 kHz, 1000 overlapping channels could be used, one at a time for each of several users. In the second method, all channels are active simultaneously, each one transmitting a particular code based on polarization, amplitude, phase, and direct sequence (DS) if necessary. The number of overlapping channels is given by the available bandwidth divided by the channel spacing. The latter is the bit rate or reciprocal dwell time on a channel until a change of code, phase, or other physical parameter is made.

For n simultaneous channels, one usually allocates $n^{-1}$ watts/channel for a nominal total power of 1 watt. This allocation produces a system with 100 channels, each transmitting 10 mW. In contrast, the same 1-watt transmitter power in the case of frequency hopping, there would always be 1 W/channel or about 20 dB more signal per detection event. This enhancement in channel power reduces the bit rate in a one-to-one fashion. Spread-spectrum methods (frequency hopping and DS spreading or DSS) are a means of multiplexing multiple users (including interferers) in the same band. Such methods generally neither provide security nor increase the spectral efficiency. They do, however, grant greater probability of reception by concentrating power into narrower channels, thus avoiding interferers (in a probabilistic view only). The cost is reduced bandwidth per (narrower) channel and reduced aggregate bit rate for the total allocated bandwidth.

Electromagnetic Theory

The discussion below develops the second basic method of frequency spreading, namely simultaneous occupancy, to its ultimate physical limit, thereby providing maximum achievable data rate in a given frequency band.

Electromagnetic Waves and Physical Channels

A single mode of the electric field of an electromagnetic oscillatory signal may be written as a function of time and frequency as $$\vec{E}_x \rightarrow \vec{\in} \mathcal{A} e^{i\omega t - i\vec{k}\cdot\vec{x}} \quad (1)$$

where $\vec{\in}$ is the polarization vector, $\mathcal{A}$ a complex amplitude, $\omega$ the angular frequency, $$k = \frac{2\pi c}{\lambda}$$

the wave vector, $\lambda$ the wavelength, c the speed of light, and $\vec{x}$ the observation point. The variation is both in space and time and is a free-space solution of Maxwell's equations. By examining the functional form of this electric field vector, one may deduce that the wave has a direction and along this direction there may be many partial waves of different frequencies and two orthogonal polarizations. If the direction is specified, as well as the distance between the source and observation point, then the wave-vector term is simply an overall phase factor that may be incorporated within the complex amplitude. The field at the observation point is written as $$\vec{E}_0 \rightarrow \hat{\in} \mathcal{A} e^{i\omega t} \quad (2)$$

A composition of several waves of different polarizations, amplitudes, and frequencies is simply a sum or integral over the relevant parameters (subscripts h and v distinguish horizontal and vertical polarization directions of the electric field). In the discrete case, which is an approximation to the true continuous signal, the combined field at the observation point is (k is now an index)

$$\vec{E}_c \rightarrow \hat{\in}_h \sum_{j,k} \mathcal{A}_{h,j,k} e^{i\omega_k^j t} + \hat{\in}_v \sum_{j,k} \mathcal{A}_{v,j,k} e^{i\omega_k^j t}. \quad (3)$$

This expression may be viewed as a vectorial Fourier decomposition of the electromagnetic field on a set of plane-wave basis functions. There are only two distinct polarizations, even though they may be combined to form a resultant transverse electric field pointing in an arbitrary direction. This may be a useful way to distinguish between different signals but there are only two physical polarization channels. If we examine each of these sums we see that the amplitude terms may be combined for each polarization, resulting in the expression $$\vec{E}_c \rightarrow \hat{\in}_h \sum_k \mathcal{A}_{h,k} e^{i\omega_k^j t} + \hat{\in}_v \sum_k \mathcal{A}_{v,k} e^{i\omega_k^j t}, \quad (4)$$

where $\mathcal{A}_{h,k} = \Sigma_j \mathcal{A}_{h,j,k}$ and $\mathcal{A}_{v,k} = \Sigma_j \mathcal{A}_{v,j,k}$.

The resulting composite field can be thought of as being composed of separate physical frequency channels for each of the two polarization directions. The complex amplitude cannot be separated from the frequency or polarization the way polarization and frequency can be physically separated. Phase and amplitude do not represent physical channels but merely states of physical channels. To make this clear, look at three different frequencies and expand the entire field. The result is 6 independent terms, each of whose phase and amplitude may be independently varied. The result is 6 physical channels, and each physical channel may contain phase and amplitude information. The equations show this explicitly.

The invention can include defining a physical channel as a particular frequency at a particular polarization (later we will combine both polarization states into the same channel for convenience). The invention can include defining a symbol on such a channel as a particular choice of phase and amplitude information. A state of the electromagnetic wave will be the four-tuple (fold) {frequency, polarization, amplitude, phase} or $\{\nu, \in, A, \phi\}$ where there are $n_\nu$ discrete frequencies, 2 discrete polarizations, $n_A$ discrete amplitudes and $n_\phi$ discrete phases. The total number of states $n_s$ in the wave is then the product of these four numbers, or $2n_\nu n_A n_\phi$. Since the phase-amplitude state can also be represented by two quadrature amplitudes, we may take $n_s$ to be $2n_\nu n_A^2$. These states determine the physical capacity of the system producing the electromagnetic wave and the system can be in only one state at any instant in time.

Since a symbol represents the state of a physical channel, a system with 6 channels may contain 6 symbols simultaneously in a given, predetermined time interval. This is shown by the following expansion for a system with three frequencies and a total of 6 independent terms $$\vec{E}_3 \rightarrow \hat{\epsilon}_h(e^{it\omega_1}\mathcal{A}_{h,1}+e^{it\omega_2}\mathcal{A}_{h,2}+e^{it\omega_3}\mathcal{A}_{h,3})+\hat{\epsilon}_v(e^{it\omega_1}\mathcal{A}_{v,1}+e^{it\omega_2}\mathcal{A}_{v,2}+e^{it\omega_3}\mathcal{A}_{v,3}). \quad (5)$$

Of course, the information in the above expression may be recombined in different manners, such as $$\vec{E}_3 \rightarrow e^{it\omega_1}(\hat{\epsilon}_h\mathcal{A}_{h,1}+\hat{\epsilon}_v\mathcal{A}_{v,1})+e^{it\omega_2}(\hat{\epsilon}_h\mathcal{A}_{h,2}+\hat{\epsilon}_v\mathcal{A}_{v,2})+e^{it\omega_3}(\hat{\epsilon}_h\mathcal{A}_{h,3}+\hat{\epsilon}_v\mathcal{A}_{v,3}). \quad (6)$$

to emphasize the three frequency channels. The terms in parentheses may be combined to emphasize the angle of polarization at each frequency along with its amplitude and phase. Evidently, by a suitable choice of amplitude magnitudes, the polarization direction of each frequency channel can be selected to point in any direction between $0 \leq \theta_k < \pi$. Similarly, the phase of the field $\phi_k$ at each complex amplitude polarization angle $\theta_k$ may be independently chosen and detected (by quadrature means); the representation in this case is $$\vec{E}_3 \rightarrow \hat{\epsilon}_1\rho_1 e^{i\phi_2}e^{it\omega_1}+\hat{\epsilon}_2\rho_2 e^{i\phi_2}e^{it\omega_2}+\hat{\epsilon}_3\rho_3 e^{i\phi_3}e^{it\omega_3}. \quad (7)$$

None of this formal manipulation changes the physical nature or separability of the 6 independent channels, each carrying amplitude and phase information, or 3 channels combined in pairs of the same polarization. However, the different representations make different channel states evident and also provide guidance as to optimal receiver design.

Physical identification of the various states within each channel is made by signal-strength measurements and quadrature phase detection. The polarization states may be separated by defining two orthogonal directions along which two dipole antennas are aligned. The frequency separation is made in the usual manner of non-linear mixing, filtering, and envelope detection. The point is that state information may be conveyed within the discrimination capability of the receiving device, but the number of symbols per channel is limited to a single one at any instant of time.

The number of bits per symbol is purely an arbitrary matter of convention and convenience, having nothing to do with the number of physical states of the system at a particular time. Thus, if we are able to quantize the quadrature amplitudes into 16 identifiable levels, then each symbol can be seen to exist in one of $2^4 \times 2^4 = 2^8 = 256$ possible symbol states. The logarithm to the base 2 gives the maximum entropy in bits of an equiprobable collection of such symbols; in this case, there are 8 bits per symbol. This observation leads to a theoretical maximum rate for digital communication, with the caveat that the independence of a frequency channel must be defined and related to the physical properties of the communication system.

Physical Channels and Symbol Rates

To borrow a notion from optics, let $\Delta\tau$ be the coherence time of the electromagnetic wave. For communication systems based on modulating the wave or carrier, the coherence time is the interval over which the carrier can be considered to be stationary in the parameter of interest. For amplitude modulation (AM), the amplitude or signal power must be approximately constant over the time $\Delta\tau$. For phase modulation (PM) or frequency modulation (FM), the phase or frequency is the relevant parameter. For polarization modulation, the polarization direction must remain relatively constant over $\Delta\tau$. If analog information is being transmitted, such as standard AM or FM radio broadcasts, $\Delta\tau$ is an approximate notion based on the effective bandwidth of the baseband information. For digital communications, $\Delta\tau$ is a precise concept, being the well-defined time duration of a chip (for DSS systems), a bit for single-pulse amplitude modulation (PAM), or a symbol in the general case. We will take $\Delta\tau$ to be the (approximate or precise) period over which the 4-dimensional state of the physical channel is stationary. Since we will be primarily interested in digital modulation, $\Delta\tau$ is a precise notion intimately connected with the definition of the state of the electromagnetic wave where $\Delta\tau$ is the time between state transitions. The notation $\Delta\tau$ is used here to distinguish the time duration of a physical state from the closely related concept of a symbol interval, usually denoted by T in the digital-communications literature (e.g., see Proakis or Peebles).[11,13]

The reciprocal of the coherence time is the symbol rate, and the total symbol rate of a system consisting of n physical channels is $$C_S = \frac{n}{\Delta\tau}. \quad (8)$$

If we can determine n, then we know the system capacity.

Suppose we have a band of width $\mathcal{B}$ Hertz available for our communications system. If we can allot a width $\Delta\nu$ to each of the n frequency channels, then n is given simply by the ratio of $\mathcal{B}$ to $\Delta\nu$. (Issues of optimally spacing the n channels within the band $\mathcal{B}$ will be addressed later when channel orthogonality is discussed.) The system capacity in symbols per second is $$C_S = \frac{\mathcal{B}}{\Delta\tau\Delta\nu}. \quad (9)$$

The product $\Delta\tau\Delta\nu$ obeys the reciprocity relation, analogous to the uncertainty principle in quantum mechanics, $$\Delta\tau\Delta\nu \geq \frac{1}{4\pi}. \quad (10)$$

This relation may be rigorously established using generalized distributions, Plancherel's Identity, and the Cauchy-Schwarz Inequality. In optics, where $\Delta\tau$ is the coherence time of a wave train, $\Delta\nu$ is the spread in frequencies comprising the train. In measurement theory (both classical and quantum), $\Delta\tau$ is the time allotted to a measurement and $\Delta\nu$ or $\Delta\epsilon$ is the precision to which the frequency or energy can be determined ($\epsilon = h\nu$ in the quantum realm). In our case, $\Delta\tau$ is the time period that a state of the electromagnetic field is stationary and $\Delta\nu$ is the channel spacing or bandwidth. All these notions are different aspects of the same underlying abstract property of a probability distribution and its Fourier transform.

The reciprocity relation is interpreted as an upper bound on the symbol rate or symbol capacity for a system occupying a band $\mathcal{B}$ Hz wide as $$C_s \leq 4\pi\mathcal{B}. \quad (11)$$

This bound is the physical upper limit to the symbol rate. For a band-limited system, the capacity is finite, unlike the familiar Shannon channel capacity for bit rate. That is, $C_s$ represents an objective physical capacity and not an information capacity, which is subjective in nature. Multiplying the reciprocity relation by $2\pi$ to represent the frequency in radians per second, the expression becomes $$\Delta\tau\Delta\omega \geq \frac{1}{2}, \quad (12)$$

which has the simple geometrical interpretation that it takes a time equivalent to one half of a period to establish the frequency of a wave train. Practically speaking, this is the time between two zero crossings of the oscillation. Increasing this limit to 1 effectively says that we should use about 13½ zero crossings to determine the frequency.

$\Delta\tau$ also determines the width of the power spectral density (PSD) in the electromagnetic wave, which is described below in more detail. This is clear from the definition of $\Delta\tau$ as the period between state transitions. From Fourier theory, if the transition is in either amplitude or phase, or both, the PSD is given by the square of a sinc function whose argument is $\nu \Delta\tau$. A carrier lasting for a period much longer than $\Delta\tau$ but containing such transitions has a PSD that is dominated by the same sinc function. The width of the PSD effectively determines the bandwidth of the system. If the system contains a single frequency channel, the width of the PSD can be taken to be the distance between the half-power points on either side of the PSD centered at the carrier frequency; this is about $1.206\Delta\tau$. If the system contains multiple frequency channels with the requirement that the channels are orthogonal, as defined by quadrature matched filters, the spacing of the channels is given by the nulls of the PSD which occur at integer multiples of $\Delta\tau^{-1}$. If the receiver is coherent with the transmitter and the modulation is bipolar in phase, the bound is ½ as the spectral nulls occur half-integer multiples of $\Delta\tau^{-1}$. Since we will be concerned with multiple orthogonal frequency channels, the applicable reciprocity bound is $\Delta\nu\,\Delta\tau = ½$ or $1$, depending on whether unipolar or bipolar signals are used. The symbol capacity for these orthogonal cases becomes $C_s \leq \mathcal{B}$ for the quadrature or incoherent detection, and $C_s \leq 2\mathcal{B}$ for bipolar coherent detection. (13)

It is these two bounds that will be used most often in the remainder of this discussion. However, when we consider orthogonal codes to be transmitted on adjacent channels, the channel-orthogonality can be relaxed due to the code orthogonality and the channels can be spaced close together depending on the length of the orthogonal code. Even for arbitrarily long orthogonal codes, the bound of Eq. 11 holds.

SYMBOL RATES AND BIT RATES

Introduction

The complete representation of a symbol for a frequency channel carrying a polarized electric field is the symbol 4-tuple $\{a_h, \phi_h, a_v, \phi_v\}$ where $a_v$ and $a_h$ are the amplitudes with vertical and horizontal polarization and $\phi_v$ and $\phi_h$ are the corresponding phases; an alternate representation is via quadrature amplitudes $\{a_I, a_Q, b_I, b_Q\}$ where a and b refer to the amplitudes of each of the two polarizations and I and Q refer to the in-phase and quadrature components. Ignoring the absolute phases and considering only phase differences between the two polarization modes produces the three-dimensional representation for a symbol as $\{a, b, \delta\}$ where a and b are the amplitudes in the two polarization directions (electric field strength measured by two orthogonal dipole antennas) and $\delta$ is the phase difference between the two signals. The particular representation chosen will impact the symbol error rates ($\mathcal{S}\epsilon\mathcal{R}$) at the receiver. Before discussing the rather complicated issue of $\mathcal{S}\epsilon\mathcal{R}$, (which depends on a geometrical extension to a hypersphere packing problem), the issue of maximum-entropy detection, probability representations in multidimensional spaces, and the particular representations in 2, 3, and 4 dimensions must be presented. We begin with a short digression on spectral efficiency.

Spectral Efficiency & Shannon's Channel Capacity

If the data rate of a signal bandlimited to $\Delta\nu$ Hertz is $\mathcal{R}$ bits per second and the spacing between adjacent wavelengths is $\Delta\nu$ Hertz, then the spectral efficiency is $\mathcal{R}/\Delta\nu$, with units of bits/second/Hertz. This measures how efficiently the bandwidth is used. Next-generation commercial optical digital wave-division-multiplexing (DWDM) systems will operate at 40 Gb/s with a channel spacing of 100 GHz, using simple binary PAM (on/off) modulation. This spectral efficiency is then 0.4 bits/second/Hz where the maximum for binary PSK is 1 bit/second/Hz. Improvement by a quadrature-amplitude-modulation (QAM) approach is suggested for fiber optics. Joseph M. Kahn and Keang-Po Ho [*Nature*, 411, pp. 1007-1010] also suggest polarization—which is our approach. They will quite naturally come to the same conclusions regarding the Poincaré sphere (see discussion below).

Even with the $\Delta\nu\Delta\tau=1$ limit, spectral efficiency can exceed 1 for modulation systems other than binary PAM, so the term "efficiency" is somewhat misleading. Shannon's channel capacity can be viewed as providing a limit on the spectral efficiency in bits/second/Hertz of $$\ln_2\!\left(1 + \frac{S}{N}\right)$$

times the bandwidth $\mathcal{B}$. For a signal-to-noise ratio of 20 dB, the spectral efficiency is then 6.66 bits/s/Hz. In the spectral-efficiency language, we have put a physical limit on spectral efficiency in symbols per second per Hertz of 1, or $4\pi$ in the unconstrained case.

It is important to note that the physical spectral efficiency of 1 is a measure of the maximum number of physical states of an electromagnetic wave (consistent with orthogonal channels); that is, it specifies a limit on the rate at which symbols, which are objective entities, can be transmitted. The Shannon channel capacity, in contrast, is a limit on the rate at which information, measured in bits, can be transmitted without error in the presence of noise. In any particular system, the channel capacity in bits per second can be greater or less than the physical capacity in bits per second (for a given number of bits per symbol) and the system's performance is bounded by both measures. That is, if the Shannon capacity is the smaller of the two, then the system is limited by that measure; if the physical symbol capacity is the smaller of the two, then the system is limited by the symbol capacity. An efficiently designed system should have both upper bounds nearly equal and an optimized system would operate close to the lower of these bounds.

Geometrical Representation

Suppose we transmit a one-dimensional signal with fixed amplitude and arbitrary phase. Measurements or determinations of the signal strength in the presence of noise at the receiver using optimum detection methods are distributed according to the probability of detection. If the additive noise is Gaussian and we neglect or avoid known interfering signals, this distribution is $$P(\xi) = \frac{1}{\sqrt{2\pi\sigma^2}} e^{-\frac{1}{2\sigma^2}(\xi-\xi_0)^2} \quad (14)$$

where $\sigma^2$ is the variance of the noise at the receiver and $\xi_0$ is the expected value of the signal strength in the frequency channel of interest. $\mathcal{P}(\xi)d\xi$ is then the probability of obtaining the amplitude value $\xi$ lying in a band of width $d\xi$. Suppose we have two possible signals to identify, given by the amplitudes $\xi_1$ and $\xi_2$. The signals are assumed to be independent and may be transmitted over the same channel consecutively. There are now two generally overlapping probability distributions, one centered at $\xi_1$ and the other at $\xi_2$. This situation is illustrated in FIG. 1.

Figure 1:
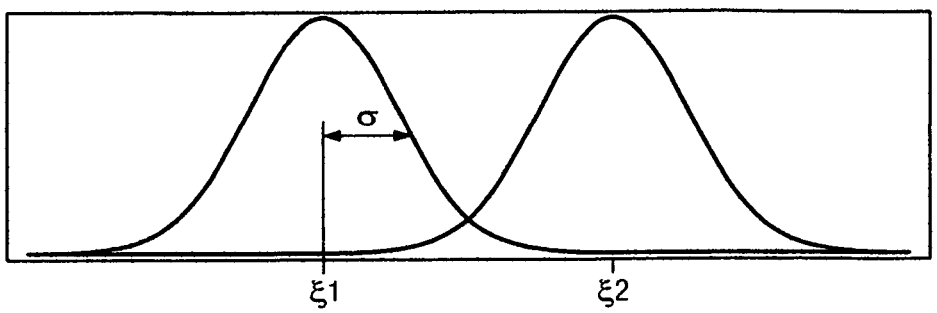
FIG. 1 illustrates binary PAM detection probability, representing an embodiment of the invention.

FIG. 1 illustrates a probability distribution for a 2-state PAM signal showing the overlapping distributions and the region of confusion. The probability distributions are the same height and width with one centered at the expected value $\xi_1$ and the other at $\xi_2$. The optimal decision boundary is indicated by the vertical black line; that is, any measurement resulting in a $\xi$ to the right of this boundary is (optimally) assigned to $\xi_2$ and any to the left to $\xi_1$. The tail of the right distribution to the left of the boundary and the tail of the left distribution to the right of the boundary are measures the probability of error in that the sum of the areas of the left tail under the right curve and the right tail under the left curve represent the probability of confusing one signal for the other. Since the total area is 2, the probability of a symbol error is this tail area divided by 2. In the above example, the probability of making an error is about 2.3%.

If two quadrature signals with expected strengths at the receiver of $\xi_0$ and $\eta_0$ are transmitted with equal probability, the probability density is two dimensional, $$P(\xi, \eta) = \frac{1}{2\pi\sigma^2} e^{-\frac{1}{2\sigma^2}(\xi-\xi_0)^2} e^{-\frac{1}{2\sigma^2}(\eta-\eta_0)^2} \quad (15)$$

where the noise variance is the same as before and affects both components equally. The probability densities in the QAM plane for transmitting one of four possible QAM signals, might look like four "humps" (with the third dimension representing the probability).

Figure 2:
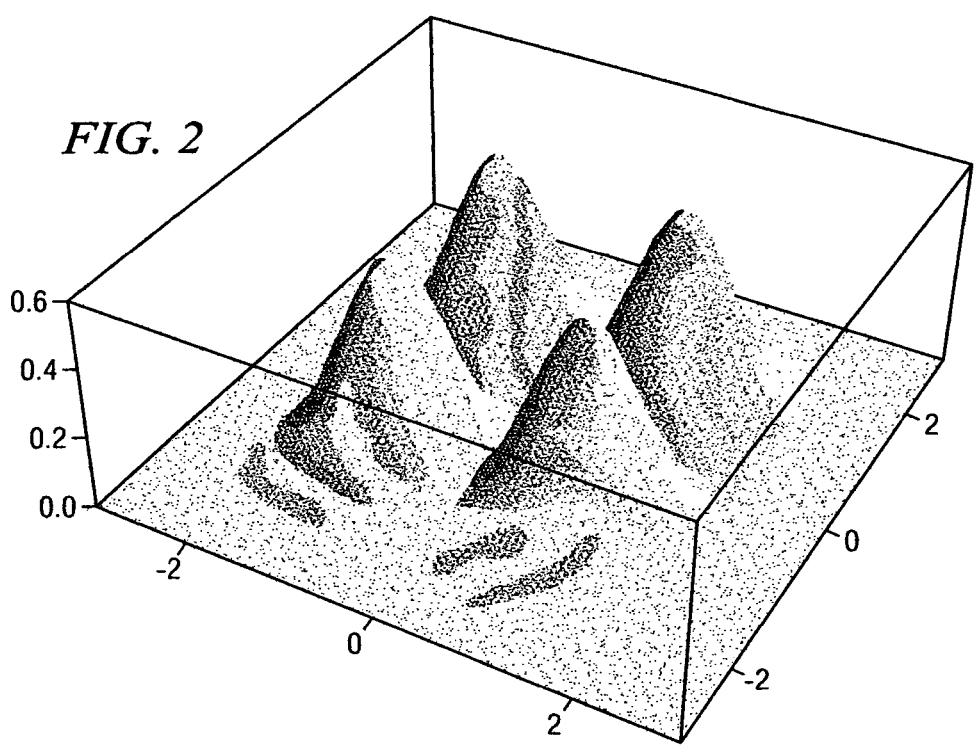
FIG. 2 illustrates a view of probability density distributions for a 4-QAM signal space, representing an embodiment of the invention.

FIG. 2 illustrates these probability density distributions for a 4-QAM signal space. The coordinates are the two amplitudes $\xi$ and $\eta$ and the probability density, which ranges from 0 to about 0.6. A convex hull is defined by the four distributions (the surface lying above or maximal to the distributions). It is somewhat more complicated to compute the tail areas, but the area under the convex hull is a straightforward calculation. Since the total area of the separate distributions is 4 (1 per distribution), the symbol-error rate is 1 minus one fourth of the area under the convex hull. If we view the distributions as a contour plot, the graphic takes on the suggestive form of circles lying in the plane.

Figure 3:
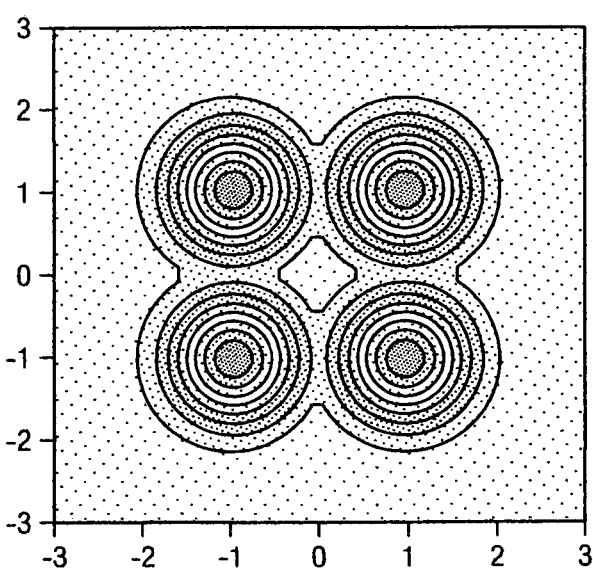
FIG. 3, illustrates another view of probability density distributions for a 4-QAM signal space, representing an embodiment of the invention.

FIG. 3 illustrates a contour representation of the 4-QAM signal constellation. The coordinates are the two amplitudes $\xi$ and $\eta$, while the probability density is represented by the several hues with the dark centers being the maximum. The contours indicate where confusion between any peak and its neighbors arises. The confusion boundaries are four vertical planes passing equidistant from each of the four peaks.

Given this representation, it is a simple matter to deduce that the optimum m-QAM is that arrangement of m circles that allows the least space between centers for a particular contour, which may be chosen as the contour specified by the radius $\sigma$. Finding this arrangement is known as the sphere-packing problem; here it is the sphere-packing problem in just two dimensions. The assignment of physical parameters to the two dimensions is straightforward in the case of a single frequency channel and one polarization state. The two dimensions are amplitude and phase $\{a_k, \phi_k\}$ or quadrature amplitudes $\{a_{I,k}, \phi_{Q,k}\}$ for each of the frequency channels of interest. This representation allows a simple visualization in terms of transmitted symbol power, defined as the sum of the squares of the two signal amplitudes.

Power may be partitioned into steps defined as the square of the radius from the center of the QAM constellation, which is the origin representing zero transmitted power, to the surface of the 2-D sphere (circle) passing through the centers of the QAM "shells." If we adjust the lattice spacing such that the minimum distance between adjacent centers is 1, the successive shell radii are the integers, 1, 2, 3, . . . Several such consecutive shells in two dimensions are illustrated in FIG. 4.

Figure 4:
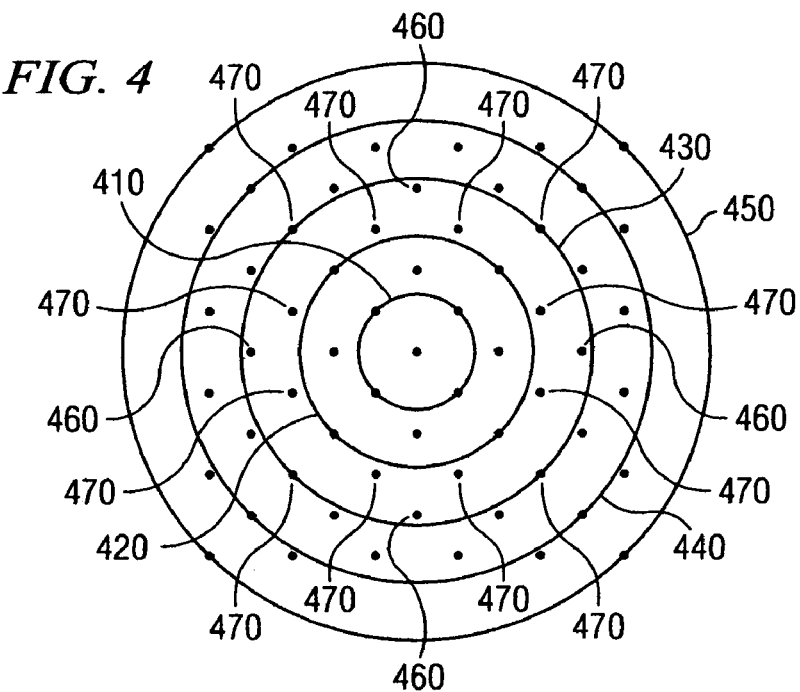
FIG. 4 illustrates a series of shells, where n, the radius of a given shell, is the maximum square root of the energy of any points lying within the shell, representing an embodiment of the invention.

FIG. 4 illustrates a series of shells at radii of 1 (green circle 410), 2 (blue circle 420), 3 (orange circle 430), 4 (red circle 440), and 5 (purple circle 450). Note the four red centers 460 inside the orange shell and the empty lattice locations inside the purple shell. Each shell passes through the square represented by the four corners located at $\{\pm n, \pm n\}/\sqrt{2}$ where n is the radius of the shell or the maximum square root of the energy of any points lying within the shell. Consider the $3^{rd}$ shell 430; the lattice-growth index, n is 3, which is the radius of the orange circle passing through the four orange corners of the square that adds the 12 orange centers 470 for that shell. Note that four points 460 (red) from the next shell also lie within the orange circle. Each new shell fills in vacancies in lower-lying shells, and contains centers at differing distances (root-energies) from the origin.

In general, a shell is defined as the sphere passing through the $2^d$ corners of the lattice hypercube (d is the dimension of the signal space). There are centers within a shell that do not lie on integer radii; however, the energy level of every center has an integer value. In four dimensions, there is at least one center in a QAM that lies on every integral value of the energy. In two and three dimensions, there are many missing centers. For example, in two dimensions, there are no centers at energies proportional to 3, 7, 11, 12, 14, 15, 19, 21, 22, 23, or 24, no matter how large the lattice. In four dimensions, these missing centers are quickly filled as the QAM index increases.

In three dimensions, the shells are surfaces of 3-spheres, and in four dimensions they are the volumes of 3-spheres (surfaces of 4-spheres). The principle of counting centers on the lattice and computing the distance (square-root of the energy represented by a center) remains the same in the higher dimensions. The concept of shell will play a key role when trellis decoders are designed for multidimensional QAMs.

Sphere Packing

In two dimensions the standard packing is on a square lattice, while the optimal packing is known (at least to mathematicians) to be on an hexagonal lattice. Simple square-lattice packing is commonly used in communications for QAM constellations even though it is definitely not optimal. Define the packing fraction η to be the proportion of space covered by the circles of the same diameter. For square-lattice packing in two dimensions, $\eta=\pi/4=0.7854$ while for a hexagonal lattice, $\eta=\pi/2\sqrt{3}\approx0.9099$. In practical terms, one can pack 15.5% more spheres (circles) into a given area with hexagonal packing. It has been intuitively obvious since ancient times (from observations on honeybees' combs) that hexagonal packing in the plane is the best type possible, but it was not mathematically proven to be the densest of all possible packings in the plane until the 1940s.

This advantage carries over to three dimensions where the cubic lattice has a packing fraction of $$\frac{\pi}{6} \approx 0.5236,$$

while face-centered cubic (fcc) and the equivalent hexagonal close-packing have a packing fraction of $\pi/3\sqrt{2}\approx0.7405$, or about 14% higher. In 1611, Kepler conjectured that cubic or hexagonal packing is the closest possible. Gauss proved that face-centered cubic was the closest possible packing on a lattice in 1831, and this result has recently been extended to hypersphere packing where η is known for dimensions 4, 5, and 6, among others, as $\pi^2/16$, $\pi^2/15\sqrt{2}$, and $\pi^3/48\sqrt{3}$, respectively. The packing fraction was upper-bounded with closer and closer bounds until the exact solution was obtained in 1993. This may seem a bit pedantic since "many mathematicians believe and all physicists know" and have known for some centuries that the actual maximum packing fraction in three dimensions is 0.7405; however, the example of QAM constellations (below) show that a slight change in packing fraction can have large consequences in error rates. The invention can thus provide a significant improvement in communications efficiency compared to existing systems via optimum packing of the transmitted symbol constellations.

The optimal criterion in the case of probability distributions for practical communications is a bit different since the packing problem refers to a space-filling solution whereas signals have finite power and do not fill all space. That is, we need a solution on the surface of the sphere with radius equal to the square root of the power in the signal. How many centers can be distributed on the surface of a sphere in two, three, or four dimensions such that the minimum distance between centers is a constant? And how are the spheres of different radii (power) to be packed, one inside another? This is a sphere-packing problem on a sphere, not in unlimited space. This problem has been solved in two dimensions where the "spheres" are circles. Some progress has been also made in higher dimensions.

In 1943, Fejer Tóth (the same mathematician who proved hexagonal packing in the plane to be the closest) proved that for n points on a unit sphere, there always exist two points whose distance d is bounded by $$d \leq \sqrt{4 - \csc^2\left(\frac{\pi n}{6(n-2)}\right)}, \quad (16)$$

and this is known to be exact for n=3, 4, 6, and 12. (For 12 points, the solution is an inscribed icosahedron). But the general problem has not yet been solved.

Figure 5:
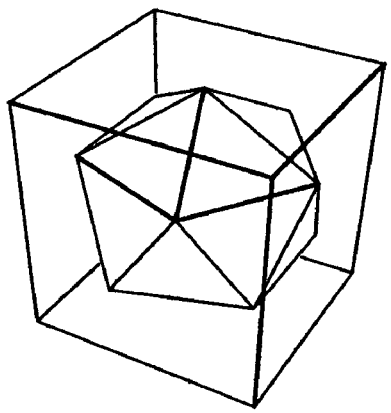
FIG. 5 illustrates 12 points distributed on the surface of a circumscribing sphere that have a constant and minimal distance between closest neighbors, representing an embodiment of the invention.

FIG. 5 illustrates an icosahedron showing the 12 points as vertices of the Platonic solid (distributed on the surface of a circumscribing sphere) that have a constant and minimal distance between closest neighbors.

For an approximate solution, using the above formula as a guide, we may resort to potential theory and minimize the potential energy of a collection of n charges free to move on the surface of a sphere. The problem stated in this fashion is a version of the n-body problem, is np complete, and has no exact solution other than for n=2 and those cases indicated above; nevertheless, it is practically solvable as long as n is not too large. An extension of the numeric code to four dimensions is straightforward. (Note that the Tóth solution above is also proof of the existence of special-case solutions to the n-body problem on a sphere. In particular, the 3-body problem on a spherical surface has a solution!)

Some idea of the gain to be achieved by going to higher dimensions is given by κ, the "kissing number," which is the number of equivalent hyperspheres that touch a given hypersphere in an n-dimensional space. In two dimensions, the arrangement is the familiar hexagonal lattice packing, so κ=6. In three dimensions, the packing is face-centered cubic, and κ=12 (as first conjectured by Newton). In four dimensions, κ=24 as found by Conway and Slone in 1992. The practical meaning of κ, given an n-dimensional signal of energy ε, and a noise level σ representing the width of the equivalent Gaussian probability density in n dimensions, is that there are a maximum of κ possible signals that have the minimum possibility of being confused when $\epsilon=2\sigma^2$. Thus if we can establish a 4-dimensional signal space, we can in some sense make use of 4 times as many signal points or constellation points as are possible with a 2-dimensional signal for the same power budget.

Two-Dimensional Signal Spaces

For the square lattice of FIG. 3, the leakage of the tails of the distribution at {0,0} under other neighboring distributions is $$1 - \frac{1}{2\pi\sigma^2}\left(\int_{-r}^{r} e^{-\frac{x^2}{2\sigma^2}} dx\right)^2 = 1 - \mathrm{erf}\left(\frac{r}{\sqrt{2}\sigma}\right)^2. \quad (17)$$

The distance between centers, represented as $\sqrt{\epsilon}=2r$, where r is the radius of the distribution in the expression above, that gives the packing fraction of $$\frac{\pi}{4} \text{ is } r = \sqrt{2}\,\delta\mathrm{erf}^{-1}\frac{\sqrt{\pi}}{2}.$$

For a given center distance 2r, σ can be 7.022% larger for hexagonal packing that for square packing. Alternatively, for a given noise level, the centers can be 6.561% closer for hexagonal packing, thus decreasing the required signaling power by about 13% (about 0.6 dB).

We can compute the error rate per center (or symbol) as that area outside a cell of the corresponding packing type. In two dimensions, we consider square-lattice and hexagonal-lattice packing with the corresponding areas within the packing cell. For square-lattice packing, the area of the distribution inside a unit cell is $$\mathcal{SL} = \frac{1}{2\pi\sigma^2}\left(\int_{-r}^{r} e^{-\frac{x^2}{2\sigma^2}} dx\right)^2 \to \text{erf}\left(\frac{r}{\sqrt{2}\sigma}\right)^2. \quad (18)$$

while for hexagonal-lattice packing it is r→δ/2 and δ the center spacing)

$$\mathcal{HL} = \frac{12}{2\pi\sigma^2}\int_0^r e^{-\frac{x^2}{2\sigma^2}} dx \int_0^{x/\sqrt{3}} e^{-\frac{y^2}{2\sigma^2}} dy = \quad (19)$$

$$\frac{6}{\sqrt{2\pi}\sigma}\int_0^{\delta/2} e^{-\frac{\xi^2}{2\sigma^2}} \text{erf}\left(\frac{\xi}{\sqrt{6}\sigma}\right) d\xi,$$

where the last integral must be computed numerically. The leakage out of a cell is 1-$\mathcal{SL}$ or 1-$\mathcal{HL}$. Since this probability "leaks" into adjacent cells (for close packing), it represents the error by which a signal transmitted to the cell in question is interpreted as belonging to adjacent cells. Of course, the cells at the edges of the constellation do not leak into neighbors located at energies beyond the maximum (nor less than the minimum), so the boundary cells have less effective leakage than those completely surrounded by neighbors. For a single layer of cells, such as 4 for the square QAM or 6 for the single-layer hexagonal QAM, this error in estimating the leakage by using the ideal approximation is at a maximum; fortunately, these cases are easy to compute exactly, so the leakage error can be bounded in any particular case. The plots of FIG. 6 shows the exact symbol error rates per symbol for the cases of 4 (green, curve 610), 16 (blue, 620), 36 (purple, 630), and 64 (orange, 640) centers; the right-most curve (red, 650) is for the case above of a space-filling, square-lattice packing.

Figure 6:
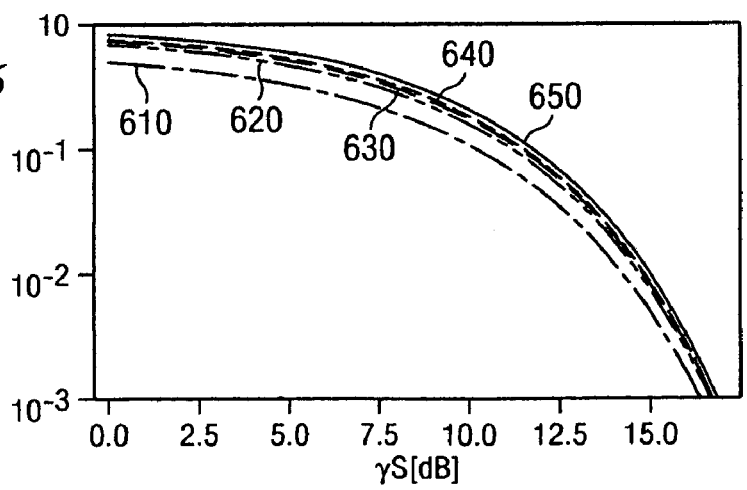
FIG. 6 illustrates error rate as a function of signal-to-noise ratio per symbol in dB, representing an embodiment of the invention.

FIG. 6 in general illustrates that as the number of constellation points increases, the error rate as a function of signal-to-noise per symbol quickly approaches that of the ideal, space-filling QAM. The abscissa, $\gamma\mathcal{S}$, is the signal-to-noise ratio per symbol in dB.

Figure 7:
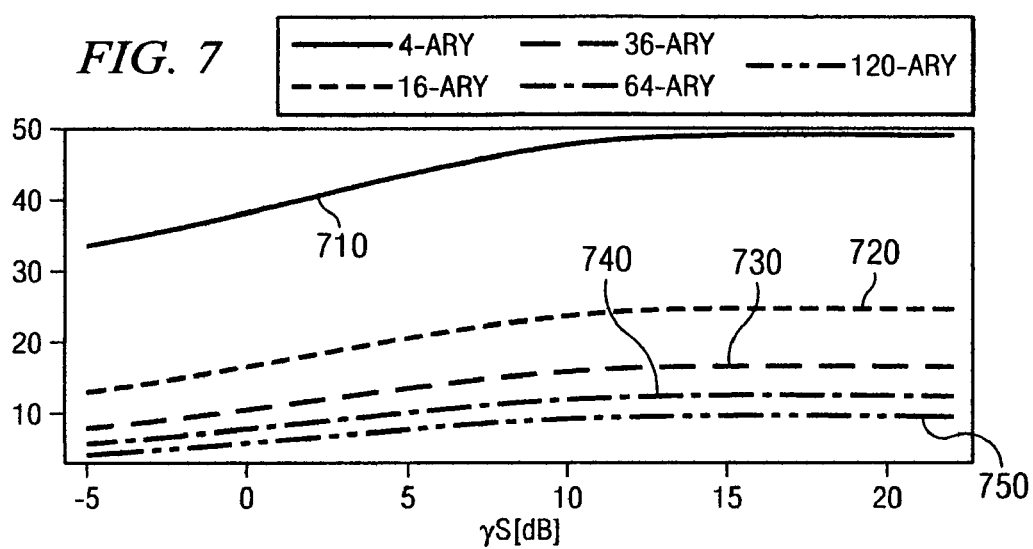
FIG. 7 illustrates percent square QAM leakage error as a function of signal-to-noise ratio per symbol in dB, representing an embodiment of the invention.

FIG. 7 illustrates the leakage error in replacing the exact QAM by its ideal, space-filling version. The worst case is the 4-center, square QAM 710 shown in green, reaching about 50% leakage error over the exact expression. As the number of centers increases, the leakage error decreases. FIG. 7 illustrates the leakage error in % for a square-lattice QAM plotted as a function of signal-to-noise ratio per QAM symbol, $\gamma\mathcal{S}$.

Figure 8:
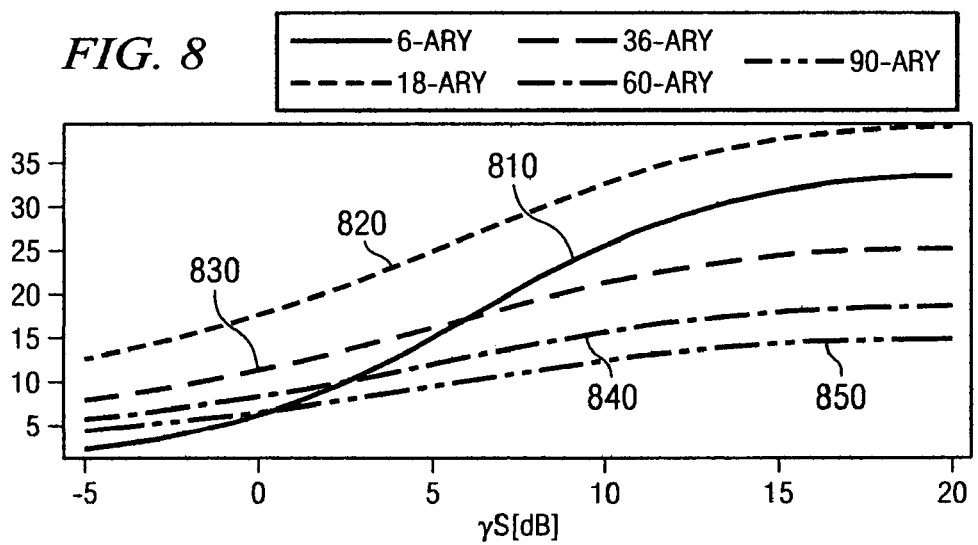
FIG. 8 illustrates percent hex QAM leakage errors as a function of signal-to-noise ratio per symbol in dB, representing an embodiment of the invention.

FIG. 8 is the same calculation as FIG. 7, but for a hexagonal QAM. The 6-ary QAM is a special case since all centers have unit distance from the origin and closest neighbors are unit-distances apart. The exact hexagonal QAM for the fewest centers 810 behaves a bit differently than the others, since the centers only have neighbors in the same shell or level. Again, as the number of centers increase, the error approaches zero.

To compare the square- and hexagonal-close packings, we must correct for the packing fraction. Since packing fraction is an area measure (in two dimensions), the correction is the square root of the packing fraction. Making this correction ensures that the QAM nearest neighbors are the same distance in both packings. Note that this is not the same as equalizing the average powers.

Figure 9:
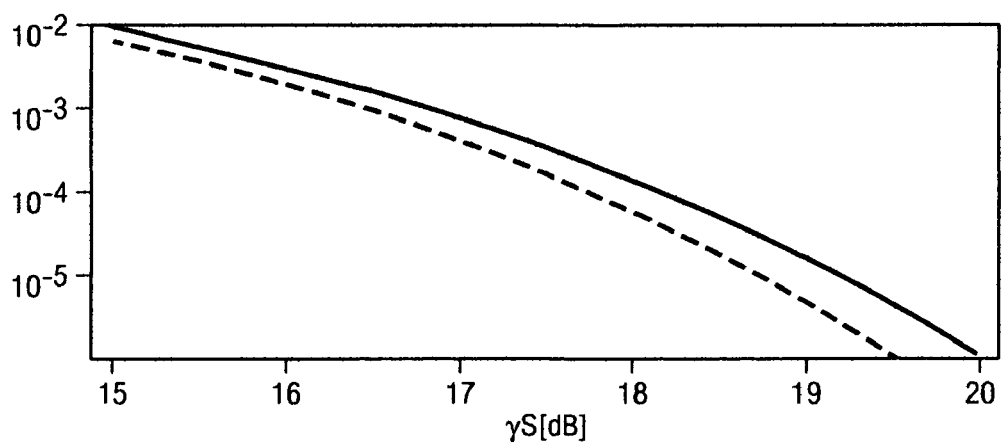
FIG. 9 illustrates symbol error rates for hex and square QAMs as a function of signal-to-noise ratio per symbol in dB, representing an embodiment of the invention.

FIG. 9 illustrates the symbol-error rate in red (on the right-most or upper curve) for the square lattice and green (on the left/lower curve) for the hexagonal lattice. The difference is about 0.5 dB in $\gamma\mathcal{S}$ and results in a factor of 3 lower symbol error rate for the hex QAM at the $10^{-5}$ error level. This difference between a square-lattice QAM and the hexagonal-lattice representation will appear in several different guises in the following development.

Three-Dimensional Signal Spaces

Since a fully polarized frequency channel is four-dimensional, it may seem pointless to consider a three-dimensional signal space. However, the situation where the absolute phases of the quadrature signals are either unknown or unimportant is best represented in three dimensions, consisting of two intensities and the phase difference between the two polarizations. Accordingly, a three-dimensional solution to the sphere packing problem, extended to the computation of probability leakage and error rates, is an important addition to the full four-dimensional case presented below. A careful development in the case of three dimensions is also a preparation for solving the four-dimensional case, where signal visualization is more difficult.

The kissing number for hexagonal close packing or the equivalent fcc packing is 12 in the three-dimensional case, so there are precisely 12 spheres touching the sphere of interest, which will be taken to lie at the origin {0,0,0}. The cell containing a sphere is a dodecahedron—but not the Platonic regular dodecahedron, which has five-fold face symmetry. A precise description of the circumscribing dodecahedron is necessary for an exact computation of the leakage from a center to its neighbors. This is a straightforward but complicated task and will not be undertaken since there are satisfactory approximations to the symbol error rates in three dimensions.

Figure 10:
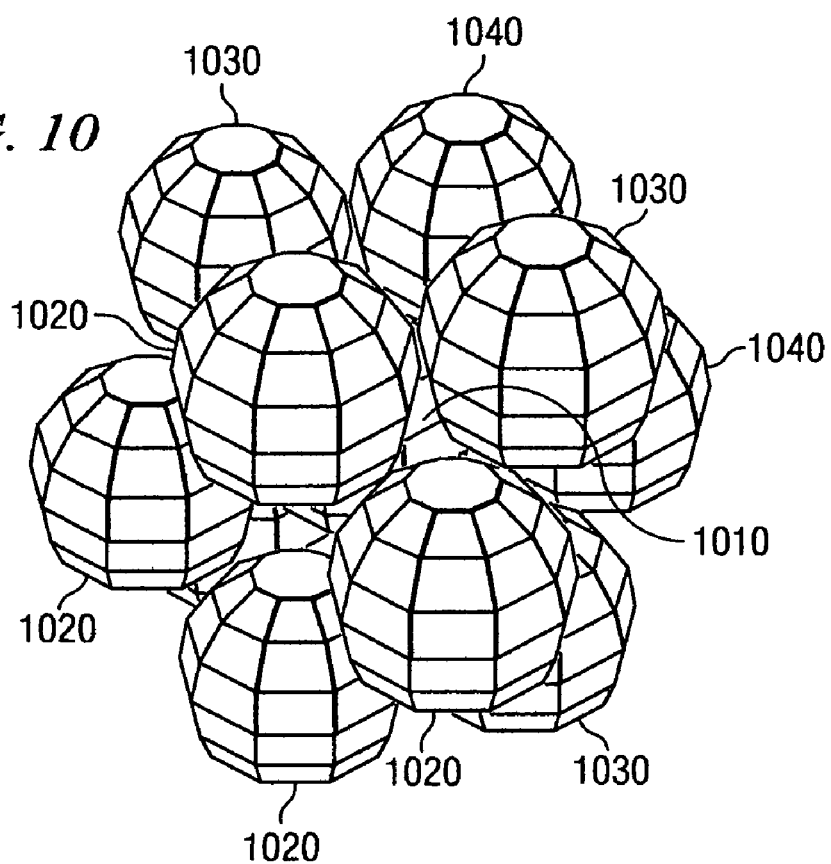
FIG. 10 illustrates face-centered cubic packing in three dimensions, representing an embodiment of the invention.

FIG. 10 illustrates fcc sphere packing in three dimensions. FIG. 10 shows the 12 nearest neighbors of the central sphere in three dimensions. Comparing this graphic with the contour plot shown above for the two-dimensional case gives a visual hint of how much packing density can be gained by going to three dimensions. The central sphere 1010 is shown with a red mesh (partially hidden). Its 12 nearest neighbors are shown in three layers of four spheres each with the front layer of spheres 1020 indicated by the blue mesh, the middle layer of spheres 1030 by the green mesh (only three are visible), and the back layer of spheres 1040 by the yellow mesh (two are hidden). The three layers are each arranged as squares, with the middle square rotated from the other two by 45°. Each of the 12 neighboring spheres is the same distance from the center sphere. The center sphere can be taken to represent any probability distribution in the 3-D QAM. In particular, consider a center sphere placed at the origin (zero power transmitted). Of course, there is no code corresponding to zero power because interpretation of an absence of energy is ambiguous. For a 3-D QAM with a single power level, there are obviously 12 states, whereas the best two-dimensional QAM with a single power level is the hexagonal arrangement with 6 states (a square QAM would only have 4 states). This advantage of more states for the same power cost carries over to multiple amplitude levels.

The concept of 'polarization' usually brings to mind a vector in three dimensions rotating about a direction of propagation. The representation employed here is that of rectangular coordinates, which will be identified with the quadrature amplitudes of the two polarization directions of the electric field in four dimensions. However, to relate these concepts to the common ones of a rotation in space, the preferred description is a bit more general that the rotating vector, which can change direction by a change in amplitude of one of the components. For the general description, recall the Stokes parameters from optics used to describe polarized light. Let the amplitudes of the two electric fields in the two different polarization directions be a and b, then the Stokes parameters are $$s_0 = a^2 + b^2$$

$$s_1 = a^2 + b^2 \quad (20)$$

$$s_2 = 2a\,b\,\cos\delta$$

$$s_3 = 2\,a\,b\,\sin\delta$$

where $\delta$ is the phase difference between the two fields. Interpreting these equations for the case of RF signals, $s_0$ is the energy in the particular frequency channel or the power per symbol in that channel. This representation has a geometrical interpretation that matches the geometry of the QAM constellation where each point has a particular energy and the range of energies can be thought of as appearing in discrete spherical shells, allowing a maximal number of points for a given maximum transmitter power. If we follow Poincaré and make the transformation $$s_1 = s_0 \cos 2\chi \cos 2\psi$$

$$s_2 = s_0 \cos 2\chi \sin 2\psi \quad (21)$$

$$s_3 = s_0 \sin 2\chi$$

we see that the signal for a given power is naturally represented as a point on a sphere (the Poincaré sphere, $\Sigma$). The particular representations of angles relates the point on the sphere $\{s_1, s_2, s_3\}$ to the polarization ellipse commonly used in optics; this is not required in the present case, but provides a convenient way to think about a three-dimensional QAM. For example, right-handed circular polarization is represented as the north pole of the sphere ($\chi = \pi/4$) and left-handed by the south pole ($\chi = \pi/4$). Linear polarization has $\delta = 0$, so the points along the equator of the sphere represent all linear polarizations. For $\chi$ positive, the polarization is right-handed and $\chi$ negative, left. In general, $\chi$ is related to the eccentricity of the polarization ellipse and $\psi$ to its orientation along the direction of propagation, quantities that are important for studying the optical properties of crystals, but are merely conveniences for studying data transmission.

The QAM constellation in three dimensions may then be thought of as lying on the surface of a set of spheres of increasing radii. The optimal packing in three dimensions is to place centers on a face-centered cubic lattice as discussed above. The packing fraction is $$\eta = \frac{\pi}{3\sqrt{2}} \approx 0.7405, \text{ the lattice is specified as } \{i, j, k\} \in Z,$$

with centers located at even values of $i+j+k$. The origin is at $\{0,0,0\}$ and contains a center for counting purposes but not for energy determination. The cube grows by increasing the lattice one step at a time (from $\pm 1$, to $\pm 2$, to $\pm 3$, and so on). The enclosing energy sphere that passes through all 8 corners of the growing cube has radius $\sqrt{\epsilon} = \sqrt{3}l$ where l is the lattice growth index, so the cube volume increases as $3\sqrt{3}l^3$ and the enclosing sphere has volume $4\pi 3\sqrt{l^3}$. The radii of the packed spheres is 1 and must be rescaled to the standard unit distance between nearest neighbors by dividing all distances by $\sqrt{2}$. For the rescaled sphere, the first shell has 12 centers (the kissing number for fcc packing in three dimensions), and contains centers at the locations $$\{\{1,1,0\}, \{1,0,1\}, \{1,0,-1\}, 1,-1,0\}, \{0,1,1\},$$
$$\{0,1,-1\}, \{0,-1,1\}, \{0,-1,-1\}, \{-1,1,0\}, \{-1,0,$$
$$1\}, \{-1,0,-1\}, \{-1,-1,0\}\}/\sqrt{2} \quad (22)$$

in rectangular coordinates. In spherical coordinates, the radius is 1 and the angles $\{\theta,\phi\} = \{2\chi, 2\psi\}$ are $$\{\{\tfrac{\pi}{2}, \tfrac{\pi}{4}\}, \{\tfrac{\pi}{4}, 0\}, \{\tfrac{3\pi}{4}, 0\}, \{\tfrac{\pi}{2}, -\tfrac{\pi}{4}\}, \{\tfrac{\pi}{4}, \tfrac{\pi}{2}\}, \{\tfrac{3\pi}{4}, \tfrac{\pi}{2}\}, \{\tfrac{\pi}{4}, \tfrac{\pi}{2}\}, \qquad (23)$$
$$\{\tfrac{3\pi}{4}, -\tfrac{\pi}{2}\}, \{\tfrac{\pi}{2}, \tfrac{3\pi}{4}\}, \{\tfrac{\pi}{4}, 0\}, \{\tfrac{3\pi}{4}, 0\}, \{\tfrac{\pi}{2}, -\tfrac{3\pi}{4}\}\}.$$

No points in the first shell lie on the poles (have circular polarization) but four of them are along the equator, having linear polarization; the other 8 are elliptically polarized. The next shell has fewer centers with two occupying the poles (left- and right-circular polarization). The centers are $$\{\{2,0,0\}, \{0,2,0\}, \{0,0,2\}, \{0,0,-2\}, \{0,-2,0\}, \{-2,0,$$
$$0\}\}/\sqrt{2} \quad (24)$$

in rectangular coordinates and have radius $\sqrt{2}$ with the angles $\{\theta,\phi\}$ $$\{\{\tfrac{\pi}{2}, 0\}, \{\tfrac{\pi}{2}, \tfrac{\pi}{2}\}, \{0, 0\}, \{\pi, 0\}, \{\tfrac{\pi}{2}, -\tfrac{\pi}{2}\}, \{\tfrac{\pi}{2}, 0\}\}. \qquad (25)$$

The remaining 4 points are on the equator and are linearly polarized. The higher shells consist mostly of elliptically polarized points; for example, there are no circularly or linearly polarized signals out of the 24 centers lying on the third shell.

Four-Dimensional Signal Spaces

The four-dimensional case is a simple generalization of the one in three dimensions. Interestingly, the optimal packing in four dimensions is unique in that body-centered cubic (bcc) has precisely half the packing fraction of the face-centered case ($\pi^2/32$ for bcc and $\pi^2/16$ for fcc). The kissing number is 16 for the bcc and 24 for the fcc packings. Also, a unit hypersphere at the center of the hypercube of side 2 just touches all 16 unit hyperspheres at each of the corners of the hypercube. For dimensions lower than 4, the radius of this center sphere is less than 1 and for dimensions higher, it is greater than 1. In spite of the known facts concerning the four-dimensional case, the problem of the shapes of the 24 hyperplanes (three-dimensional solids) that bound the spheres is just too complicated to be worthwhile for understanding, so we will rely instead on approximations to compute the symbol-error rates.

A four-dimensional arrangement of 24 hyperspheres surrounding a central one projected onto a two-dimensional surface (the plane of this document) would take more explanation for less insight than the projection in the previous section. The main idea is clear—there are 24 nearest neighbors and hence twice the density of the three-dimensional case and 4 or 6 times that of the two-dimensional cases.

The packing fraction is $$\eta = \frac{\pi^2}{16} \approx 0.6169,$$

the lattice is specified by $\{i,j,k,l\} \in Z$, and the centers are located at even values $i+j+k+l$. The origin is at $\{0,0,0,0\}$ and again contains a center for counting purposes but not for energy determination. The hypercube grows by increasing the lattice one step at a time on all sides (from $\pm 1$, to $\pm 2$, to $\pm 3$, and so on). The enclosing energy hypersphere that passes through all 16 corners of the growing cube has radius $\sqrt{\epsilon} = \sqrt{4l}$ where $l$ is the lattice growth index, so the cube volume increases as $16l^4$ and the enclosing sphere has volume $$\frac{1}{2}\pi^2 16 l^4.$$

The close-packed spheres have unit radius on this lattice and are rescaled to give a unit distance between closest neighbors by dividing all lengths by $\sqrt{2}$.

There is a natural extension of the Stokes parameters and the Poincarésphere to four dimensions by simply considering the absolute phases within a symbol to provide the fourth dimension. In this case, one may take the four rectangular coordinates to be the four quadrature amplitudes, one pair on each of the two orthogonal antennas. Then, $$s_0 = a^2 = b^2$$

$$s_1 = s_0 \sin \psi \sin \phi \cos \theta$$

$$s_2 = s_0 \sin \psi \sin \phi \sin \theta \quad (26)$$

$$s_3 = s_0 s_0 \sin \psi \cos \phi$$

$$s_4 = s_0 \cos \psi$$

where $\{\psi, \phi, \theta\}$ are the hyperspherical angles in direct analogy with the spherical angles $\theta$ and $\phi$ in three dimensions. $\psi$ equal to 0 or $\pi$ defines the north or south pole (respectively) of the hypersphere. The radius, $s_0$, is the energy in a symbol or the power level for that symbol. In analogy with the 3-D case, the centers on the first energy surface (radius 1) are located at the 24 points $$\{\{1,1,0,0\}, \{1,0,1,0\}, \{1,0,0,1\}, \{1,0,0,-1\}, \{1,0,-1,0\}, \{1,-1,0,0\}, \{0,1,1,0\}, \{0,1,0,1\}, \{0,1,0,-1\}$$

$$\{0,1,-1,0\}, \{0,0,1,1\}, \{0,0,1,-1\}, \{0,0,-1,1\}, \{0,0,-1,-1\}, \{0,-1,1,0\}, \{0,-1,0,1\}, \{0,-1,0,-1\}, \{0,-1,-1,0\}$$

$$\{-1,1,0,0\}, \{-1,0,1,0\}, \{-1,0,0,1\}, \{-1,0,0,-1\}, \{-1,0,-1,0\}, \{-1,-1,0,0\}\}/\sqrt{2} \quad (27)$$

with none of them at the poles. The second sphere (radius $\sqrt{2}$), however, also has 24 centers with one at each of the poles $\{0,0,0,\pm\sqrt{2}\}$; six on the equatorial plane (linear polarization), and the remaining 16 represent elliptical polarization. Note that the coordinates above can be transformed to phase differences and power differences that should make for a simpler receiver architecture. For now, just take the centers to be on the lattice $\pm 1/\sqrt{2}$ and make use of the Stokes parameters at a later date should the need arise.

Symbol Error Rates

Introduction

Before proceeding to discussions on symbol error rates, it is a good idea to clarify the differences between symbols and bits. Referring to the above sections on the electromagnetic fields at the receiver, remember that, physically, the field states can be represented directly as symbols in the sense that for a given measurement period, a symbol has a one-to-one correspondence with the state of the electromagnetic field. Also remember that Shannon's channel capacity is a measure of the bit rate, not the symbol rate. Essentially, symbols are objective, being states of the physical fields, while bits are subjective and represent arbitrary assignments of codes to symbols. Shannon's channel-capacity theorem puts a weak bound on this subjective mapping by relating the bit rate to the signal-to-noise ratio within a given bandwidth. Thus, while bits are subjective, they must obey some restrictions imposed by the external world of noise. [A more poetic way of stating the difference is to note that bits are "from Venus" and symbols "from Mars"; symbols are the Yang (the overt aspect) and bits the Yin (the hidden or secretive aspect).] Some examples should make this point clear.

Suppose we have a signal limited to a frequency band between 5.700 and 5.701 GHz. It is band-limited to a 1-MHz range, a situation not uncommon in DS systems. Suppose the spreading codes are random but consist of 16 chips each [Shannon found random codes to be as good as carefully designed codes for most purposes] but known to both transmitter and receiver. A bit is then represented by a particular set of 16 random phase "chunks" each lasting about 1 μs. The bit rate is simply one-sixteenth of the chip rate, or 62.5 kb/s. Now take precisely the same physical system, but reinterpret the received signal as 16 different bits detected independently (each chip is now a bit). Suddenly, we are receiving at a rate of 1 Mb/s without changing anything but our perception. Of course, any preconceived notions as to the knowledge of the spreading codes is ignored at the receiver, but nothing has changed except this subjective perception. Interestingly, the channel-capacity theorem applied to these two different interpretations as to what constitutes a bit, assuming that the communication takes place at the Shannon limit for the same transmitter power and bandwidth, imply noise figures differing by 13.54 dB. The process gain for 16 chips is 12.04 dB so the two are quite different. The 1.5-dB difference between these two figures can be interpreted as the gain in optimal detection of 16 coherently detected chips, where the code is known, over 16 purely independent bits whose relationship is random.

Here is another example. Suppose we are sending symbols comprised of quadrature amplitude information. That is, each symbol rides on a carrier having a specific phase and amplitude. The usual representation of such a signal is by a QAM constellation consisting of a number of points, each occupying the same frequency band. To take a particular instance, suppose the QAM constellation is 16 by 16, consisting of 256 different centers so there are 8 bits per QAM symbol. Suppose the system is designed to transmit a symbol every microsecond. Then the symbol rate is 1 MHz and the average bit rate is 8 Mb/s. Of course, this works as long as the receiver knows to interpret a received physical symbol as one of the 256 possible constellation points. We assume that the transmitter emits symbols evenly distributed over the entire 256-QAM constellation and that the noise at the receiver is sufficiently small to allow clean separation of all points in the constellation. What happens if the receiver suddenly becomes not quite as knowledgeable about the details of the energy it is receiving? To be specific, suppose the receiver interprets the phase of the signal as positive or negative and knows nothing about amplitude. What is the bit rate in this case? Each symbol now has two possible states: left half or right half of the QAM plane as seen by the ignorant receiver. The bit rate is back to 1 MHz even though nothing physical in the channel has changed.

An objective, numerical value for the two interpretations can be assigned by inverting the channel capacity to give an expression of the minimum noise level needed to achieve an error-free transmission (as was implicitly done above) as $$N \leq P(2^{C/B}-1)^{-1} \tag{28}$$

where $\mathcal{N}$ is the noise power at the receiver, $\mathcal{P}$ the signal power at the receiver, $\mathcal{C}$ is the Shannon channel capacity in bits per second, and $\mathcal{B}$ is the bandwidth in Hertz. In dB, the noise limit is $$N_{dB} \leq P_{dB} - 10 \log(2^{C/B}-1) \tag{29}$$

For the two ways of interpreting the QAM signal, $\mathcal{N}_{dB} \approx \mathcal{P}_{dB} - 24.06$ dB for the knowledgeable receiver and a much larger $\mathcal{N}_{dB} \approx \mathcal{P}_{dB}$ for the ignorant one. Since both cases are assumed to take place at the Shannon limit, the transmissions are essentially error free. The first observation is that the physical situation is identical in the two cases, so the extra 24 dB of signal-to-noise can only be a subjective numerical measure of the knowledge required to interpret the physical signal as one of 256 possible states of the electromagnetic wave. The second observation is more prosaic and simply states that the maximum cost of doing business with the 8 by 8 QAM is 24.06 dB. If the system were designed to operate at a bit-error rate of $10^{-6}$, this cost would be about 24.27 dB as obtained from the usual bit-error-rate (BER) calculations [see Proakis, p. 278]. Incidentally, this means that the system simply cannot operate at a BER of $10^{-6}$, as it would then violate the channel-capacity theorem. This leads to the final observation: The usual BER estimates do not make use of Shannon's channel-capacity theorem and therefore do not consider the limit of errorless reception, simply allowing the error to approach zero, never reaching it even in the Shannon limit. The calculation above provides the limiting value, missing from the usual approach, which can give a false indication of error rate.

Making these fundamental observations forces one to concentrate on the physical notions of a symbol before thinking about the subjective notions of a bit. To this end, we need to keep the electromagnetic theory and the wave solutions of Maxwell's equations firmly in mind. The benefits are in gaining a clearer picture of the physical nature of a symbol and the ability to transmit more information than is usually assumed (as shown below when symbol-error rates are compared).

Below, we consider 5 cases of practical interest. In two dimensions the (non-optimal) fcc close packing is compared to the optimal hexagonal-lattice packing. Note that the standard square-lattice packing is equivalent to fcc packing when rotated in the plane by 45°. This observation has practical consequences in that the maximum power required is less in the rotated case by a factor of $\sqrt{2}$. In three dimensions, the optimal fcc lattice is used, while the two packings of interest in four dimensions are the tensor product of two 2-D hexagonal packings and the optimal 4-D fcc packing. [The product packing is of interest once one has the hexagonal-lattice QAM functioning in two dimensions, although it is by no means close to optimal.]

Another common practice is to place the ideal that all counting measures should be based on a power of two ($2^n$) or a power of power-of-two ($2^{2^n}$) foremost in system design. In most cases, this is a mere convenience with a practical consequence of minimal hardware for encoding and decoding. For example, if there are $2^n$ states to deal with, then hardware based on the binary system is most efficient and search methods based on efficient binary trees are easy to implement. Another compelling reason is that coding sequences have lengths that are powers of 2 (e.g., the Walsh codes) or one less than a power of two (m-sequences). However, in today's climate of large-scale integration and crowded RF spectrum, it may be worth the extra effort and expense to design for minimum error rates rather than a numerological ideal. If a power of two is required for a code, say $2^n$, the next-higher multidimensional QAM with a number of centers greater or equal to $2^n$ can be chosen and the extra centers, if any, can either be ignored or assigned for auxiliary communications, perhaps at much lower bit rates, for conveying control or status information between transmitter and receiver.

Peak & Average Powers

Since the number of centers and the total power in the 2-, 3-, and 4-dimensional QAMs can be calculated exactly for a given minimum distance between QAM centers, the following graph showing the behavior of the average QAM energy as a function of the number of bits represented by the constellation is accurate. Note that, at 15 bits, the 2-D fcc QAM requires 21 dB more power than the 4-D case. This is another way of stating that sphere packing in 4 dimensions is much more efficient than in 2.

Figure 11:
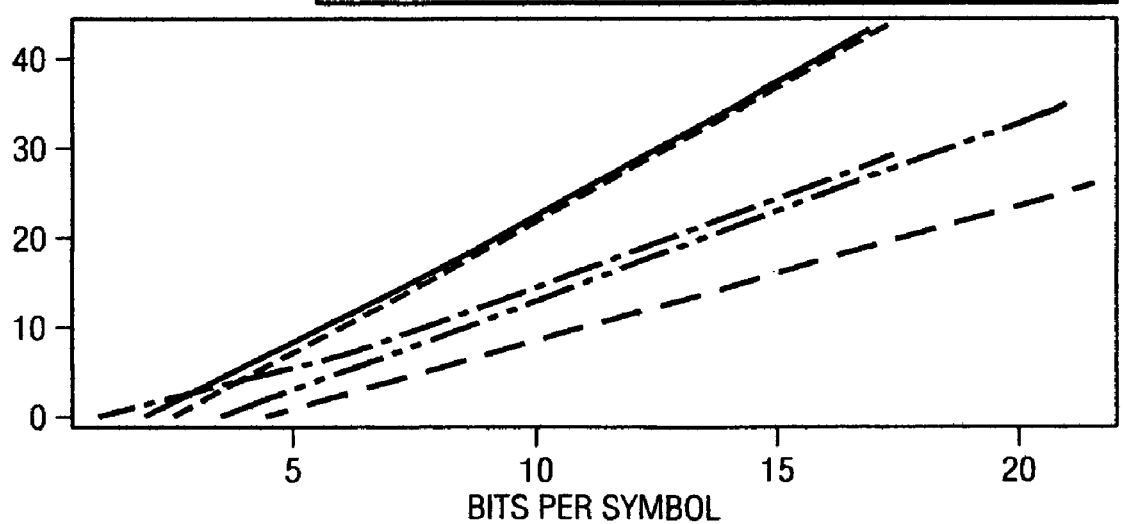
FIG. 11 illustrates the required average energy dB to transmit a symbol as a function of the bits per symbol, representing an embodiment of the invention.

FIG. 11 illustrates the required average energy to transmit a symbol as a-function of the bits per symbol. These curves were obtained by computing the positions of all QAM points as a function of lattice growth; the number of centers were then counted and the energies (distances squared) were computed, allowing the average energy per constellation to be found.

If the QAM in each case is confined to lie inside a sphere of radius $\rho$, where $\rho$ is the distance to that center farthest from the origin, then $\rho^2$ is a measure of the peak power. For the 2-D case of fcc packing, the centers are not efficiently packed in a sphere since the sphere must pass through the corners of a square (as illustrated above in the section Geometrical Representation). The distinction between the hypercube exactly enclosing the constellation and the hypersphere bounding the constellation becomes less as the dimensions increase. Peak powers are usually somewhat larger than the corresponding average powers, and never smaller. A specific system design should consider the maximum peak power as well as the average power required for transmission.

Symbol Error Rates

A calculation of the exact expressions for the symbol-error rates ($\mathcal{S}e\mathcal{R}$) for the two-dimensional cases of square lattice and hexagonal lattice is straightforward. The point to note is that there are essentially four types of centers to consider: (1) centers adjoining the central distribution at the origin; (2) centers totally surrounded by neighbors; (3)

centers on the edge of the QAM; and (4) centers at the corners of the QAM. In three and four dimensions, the situation is more complex in that there are more types of centers, since a bounding cube can be cut by distributions at several different distances and the bounding planes are complicated to describe, making the 3- and 4-dimensional-integrals a numerical nightmare. The graphs below make use of the approximation for the area of the convex hull of the probability distribution in n dimensions for a single center bounded by neighboring centers spaced on lattice centers.

$$A\text{hull} = (2\pi\varepsilon^2)^{-n/2}\left(\int_{-\delta 2}^{\delta/2} e^{\frac{\xi^2}{2\varepsilon^2}} d\xi\right)^n = \text{erf}\left(\frac{\delta}{2\sqrt{2}\,\varepsilon}\right)^n. \quad (30)$$

This expression was scaled in abscissa to agree with the above graphs showing average power as a function of the number of bits and is quite accurate for about 10 bits and more. For fewer than about 10 bits, the results are approximate although adequate for system design. For m centers, the hull area is m times the above expression, so the average area is given by the above equation. One minus the hull is the confusion area or the equivalent symbol-error rate for a receiver.

The symbol-error rate for 6 bits or 64 QAM centers is shown below for the five different QAM types considered. The error rate is plotted against the signal-to-noise ratio per bit in dB. The 4-D QAM requires 7.3 dB less power than the 2-D QAM to achieve the same error rate of $10^{-5}$. For 15 bits, the SNR per bit increases by about 1 0 dB but the difference between the 2-D and 4-D QAMs is now 21 dB.

Figure 12A:
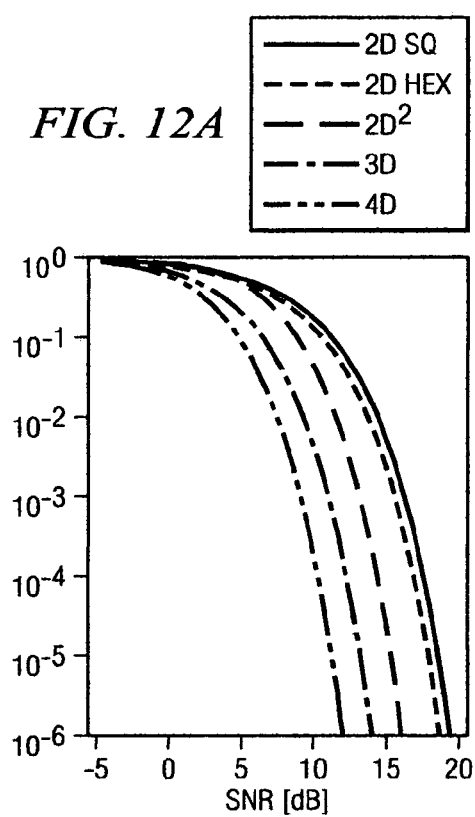
FIGS. 12A and 12B illustrate symbol error rates (for 6 bits per symbol FIG. 12A and 15 bits per symbol FIG. 12B) as a function of signal-to-noise ratio, representing an embodiment of the invention.
Figure 12B:
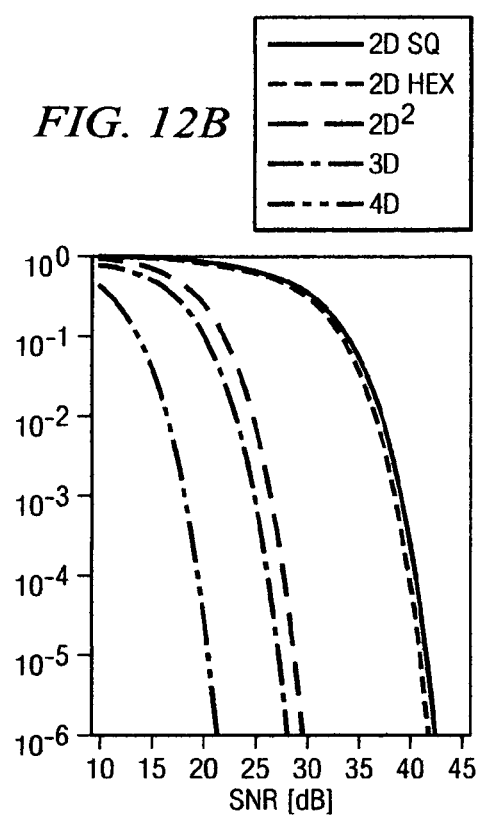

FIGS. 12A and 12B illustrate five QAM types in the context of 6-bit (FIG. 12A) and 15-bit (FIG. 12B) symbols, including the two-dimensional fcc case (2-D sq in red) and hexagonal packing case (2-D hex, orange), the three-dimensional fcc case (3-D, purple), the four-dimensional product of two 2-D hexagonal QAMs ($2D^2$, blue), and the four-dimensional fcc case (4-D, green). For the minimal case of 2 bits per symbol, all error rates converge at about 9 dB for an SER of $10^{-5}$. This is the minimum γ (SNR per bit in dB) to use in the power budget calculations.

Figure 13A:
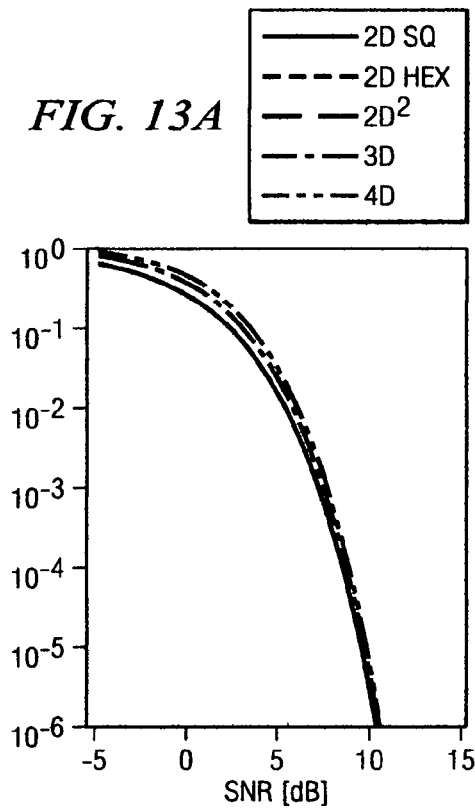
FIGS. 13A and 13B illustrate symbol error rates (for 2 bits per symbol FIG. 13A and 4 bits per symbol FIG. 13B) as a function of signal-to-noise ratio, representing an embodiment of the invention.
Figure 13B:
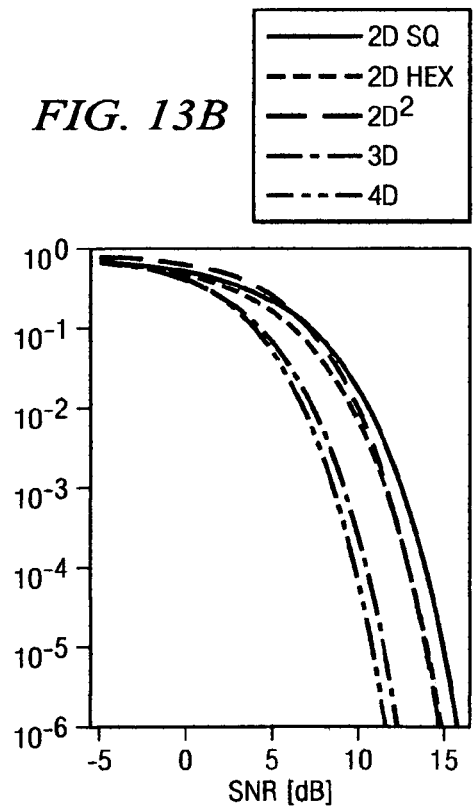

FIGS. 13A and 13B illustrate five QAM types in the context of 2-bit (FIG. 13A) and 4-bit (FIG. 13B) symbols, including the two-dimensional fcc case (2-D sq in red) and hexagonal packing case (2-D hex, orange), the three-dimensional fcc case (3-D, purple), the four-dimensional product of two 2-D hexagonal QAMs ($2D^2$, blue), and the four-dimensional fcc case (4-D, green). Incidentally, the graph for 2 bits per symbol gives some indication of the error in the approximations used, as all five curves should lie on top on one another (the average power is the peak power and is equal to 1, and there are 4 centers in each QAM).

Figure 14:
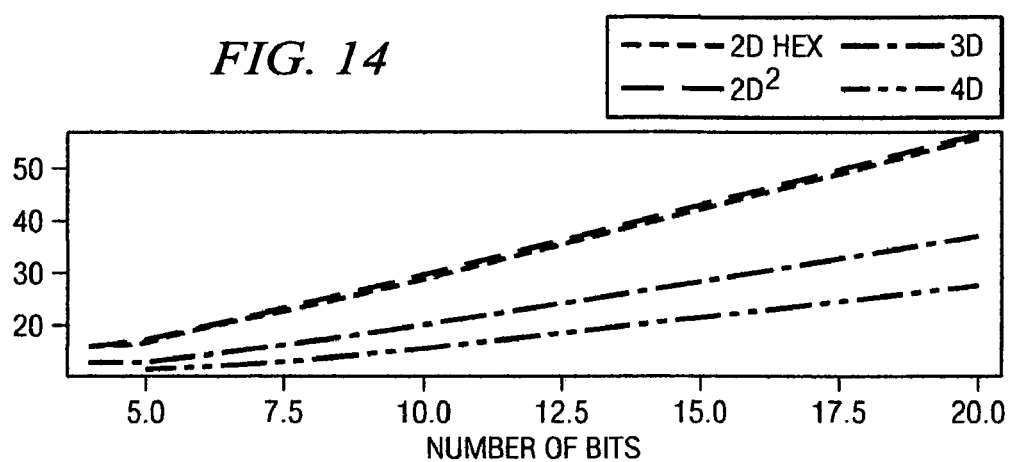
FIG. 14 illustrates required signal-to-noise ratio per bit in 2, 3 and 4 dimensions as a function of the number of bits, representing an embodiment of the invention.

FIG. 14 illustrates the required SNR per bit in dB for 2 ($2D^2$ & 2D Hex), 3 (3D), and 4 (4D) dimensions. FIG. 14 shows the required SNR per bit for 2 dimensions (square in red and hexagonal in orange), 3 dimensions (purple), and 4 dimensions (blue).

Figure 15:
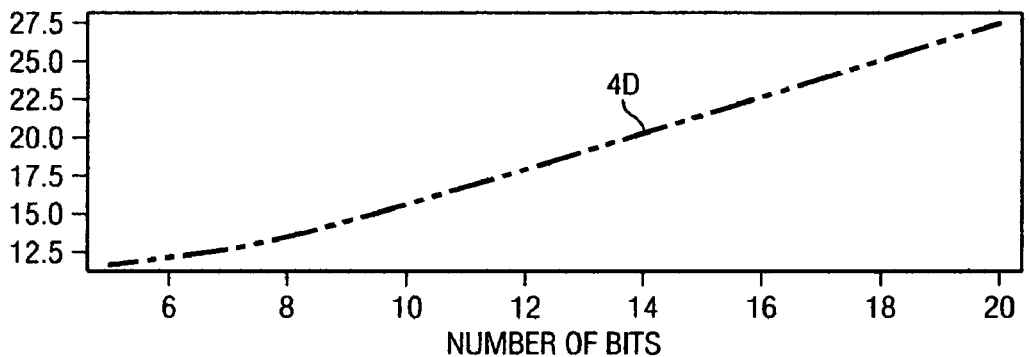
FIG. 15 illustrates required signal-to-noise ratio per bit in 4 dimensions as a function of the number of bits, representing an embodiment of the invention.

FIG. 15 illustrates the required SNR per bit for fcc packing in four dimensions.

The four-dimensional fcc case is shown in FIG. 15 alone for clarity.

ORTHOGONALITY

Definition of "Orthogonality"

Define $\mathcal{V}$ as the set of all functions of the form $h(t)=\sin(2\pi vt+\phi)$ on the interval $0 \leq t \leq \Delta\tau$. Define the inner product between $f \in \mathcal{V}$ and $g \in \mathcal{V}$ as $$g \cdot f = h \cdot f = \frac{1}{\Delta\tau}\int_0^{\Delta\tau} f(t)g(t)dt \quad (31)$$

and the norm of a function f as $$\|f\| = \sqrt{f \cdot f} = \left(\frac{1}{\Delta\tau}\int_0^{\Delta\tau} f(t)f(t)dt\right)^{1/2}. \quad (32)$$

The inner product of any two functions in $\mathcal{V}$ with different frequencies and phases is $$\frac{1}{2}\cos(\pi\Delta\tau(v_2 - v_1) + \phi_2 - \phi_1)\text{sinc}(\Delta\tau(v_2 - v_1)) - \quad (33)$$

$$\frac{1}{2}\cos(\pi\Delta\tau(v_2 + v_1) + \phi_2 + \phi_1)\text{sinc}(\Delta\tau(v_2 + v_1)).$$

The behavior of this inner product as a function of the frequency difference is dominated by the first sinc function which has nulls at integer multiples of $\Delta\tau^{-1}$.

From the viewpoint of the receiver, orthogonality means non-interference between signals on adjacent channels. Thus, orthogonality is dependent on the method of detection. As a matched filter provides an optimal detector, consider the signal $f(t,v)$; it has the matched filter represented by the signal $f(\Delta\tau-t,v)$. The normalized response of the matched filter to a signal on an adjacent channel $\Delta v$ Hertz away, assuming the phase is known to the receiver, is $$\int_0^{\Delta\tau} f(\tau, v + \Delta v)f(\Delta\tau - \tau - t)d\tau = \text{sinc}(\Delta\tau\Delta v) \cdot \text{sinc}(\Delta\tau(\Delta v + 2v)). \quad (34)$$

The behavior as a function of the channel spacing is dominated by the first term as above, and has nulls at the same locations. In both views of orthogonality (the signal viewpoint and the receiver viewpoint), the result is the same: channels spaced an integer multiple of $\Delta\tau^{-1}$ Hertz apart are orthogonal in that adjacent-channel information cannot be confused for in-channel information since the out-of-channel response is zero.

Symbol Orthogonality

If the phase of the incoming signal is unknown, quadrature detection is employed. The response of a pair of matched, quadrature filters as a function of channel spacing or frequency difference is shown below where the abscissa is in units of the reciprocal detection time.

Figure 16:
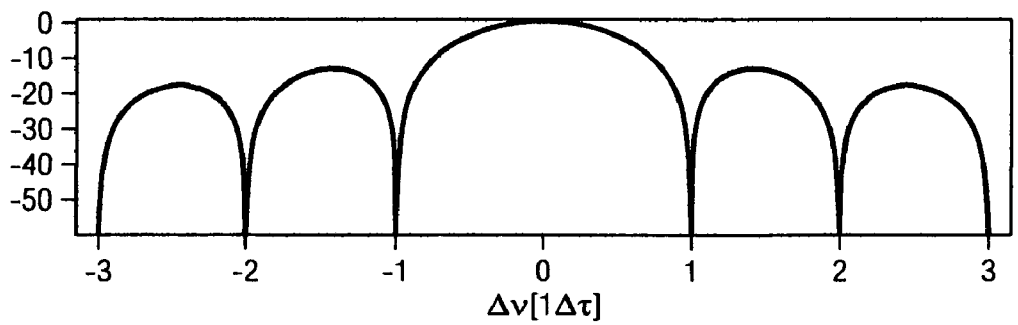
FIG. 16 illustrates the normalized power response in dB of matched quadrature filters as a function of channel spacing or frequency difference, representing an embodiment of the invention.

FIG. 16 illustrates the closest possible channel spacing for the least-interfering channels is then $\Delta v\Delta\tau=1$ and the channels are orthogonal. Also note that an optimal detector for a frequency channel is a quadrature pair of filters matched to that channel. The filters are sampled at time $t=\Delta\tau$ where $\Delta\tau$ is the observation time. Adjacent channels produce null responses in the matched filter if they are spaced by integer multiples of $\Delta\tau^{-1}$ from the channel being observed. The densest channel spacing for the least interference (spectral leakage) between channels is $\Delta v=\Delta\tau^{-1}$. Rewriting this result, we see that $\Delta v\Delta\tau=1$ must hold when orthogonality is required. In this case, the physical symbol rate is reduced by a factor of $4\pi$ over its theoretical maximum.

This argument holds in an absolute sense for symbols that are stationary states, hence the time $\Delta\tau$ is the symbol time as introduced above. Another requirement for strict orthogonality is that adjacent channels be coherent in that all the symbols start and stop at the same times. If symbols all have the same duration AT but are allowed to start independently of each other, then there is an error in the overlap between channels. A matched filter tuned to a given channel and sampled at the precise symbol time for that channel will not produce a zero result when exposed to a symbol in an adjacent channel that is delayed in time. If offset in time from the expected symbol is denoted $\delta$ where $|\delta|<\Delta\tau$, the error introduced by an adjacent channel is $\epsilon\mathcal{MF}$ where $$|\varepsilon| < \frac{1}{\pi\Delta\tau(2v+\Delta v)}, \quad (35)$$

and $v$ is the channel frequency. In most cases, $\Delta v<<v$, so this error is quite small. For example, in the 5.8 GHz band for 1-MHz channel spacing, this error is less than $30\times10^{-6}$ (about –45 dB) of the response to the in-phase symbol on the correct channel.

The following three sections extend the orthogonality concept to chips, bits, and composite symbols.

Multidimensional Orthogonal Signals

In the literature, the concept of an orthogonal set of signals is often introduced. Such signals consist of M components separated in time or frequency, or both. Since the separation is such that only one component has any signal power at any one time or on any single frequency channel, the signals viewed as M-dimensional vectors are certainly orthogonal. Both Peebles[11] and Proakis[13] present extended discussions of orthogonal signals. The concept of multidimensional signals provides a commonly used coding scheme wherein orthogonal sets of functions comprise the constellation points of a signal space. A set of N orthogonal signals can always be constructed by choosing orthogonal functions as the signals (orthogonalization procedures are available for sets of arbitrary signals) then assigning a single signal to each coordinate in the N-dimensional space. By shifting the origin to the geometric mean of the space, the signal points form a constellation in a space of N-1 dimensions where each point lies on the vertex of an (N-1)-dimensional simplex.

Another commonly used modulation method is M-ary pulse-position modulation (M-PPM) where M is usually a power of 2 and allow biorthogonal signals (essentially the signal and its negative), providing two states for each component of the M-dimensional vector. Then, since a hypercube in M dimensions has $2^M$ corners, each signal is represented as the corner of a hypercube. For example, in three dimensions, the hypercube is the ordinary cube with corners at $\{\pm\sqrt{\epsilon}, \pm\sqrt{\epsilon}, \pm\sqrt{\epsilon}\}/\sqrt{\epsilon}$, representing 8 orthogonal signals; here, $\epsilon$ is the energy in a symbol (signal). Such signal structures are convenient for binary systems where each signal or corner of the hypercube represents a binary number with M digits. That is, a transmitter based on an M-dimensional hypercube can transmit an average of M bits per symbol. However, the peak transmitter power (the energy per symbol divided by the symbol time, or $\epsilon\Delta\tau$) is also the average power and the system is inefficient unless probability hyperspheres centered on the hypercube corners just touch their nearest neighbors (as illustrated in FIGS. 3 and 10). Since there must also be a hypersphere at the origin having the same radius as the other probability hyperspheres to represent the case of zero power transmitted, the most efficient packing is where the $2^M$ hyperspheres just touch the zero-energy hypersphere. This is impossible except in four dimensions. In higher dimensions, the zero-energy sphere (the region where it is impossible to distinguish between the cases of no signal being transmitted and the presence of an actual transmission) has a radius larger than the spheres touching it, meaning that the corner hyperspheres cannot touch, leaving an unused volume of the space between corner distributions that cannot be occupied by any signal volume; this unused volume is a measure of the inefficient usage of the signal space.

The usual way of representing the symbol error for the binary hypercube is as a function of the SNR per bit. Since the corners of the hypercube move away from each other as the signal strength increases, the noise level can also increase by the same amount for the same level of error. This is possible since there are no probability distributions filling the volume of the hypercube other than those at the $2^M$ corners. This is in stark contrast to our method of hypersphere close packing for optimizing the number of constellation centers for a given average power.

The orthogonality of conventional multidimensional signals is achieved in the temporal domain—each component of a signal occupies a different time slot, with the kth component present only during the kth period. Transmission of an M-dimensional signal then requires a period of M $\Delta\tau$, where $\Delta\tau$ is the symbol interval required to detect a single component. This is also in stark contrast to our development of four-dimensional signals, where each signal is also a symbol occupying the same time period as all others. For a 20-PPM multidimensional signal, each constellation signal requires a time period $20\Delta\tau$ and an energy $\epsilon$. For the 4-dimensional QAMs presented below, transmitting the same information requires a time period of only $\Delta\tau$, a factor of 20 less, but requires significantly more energy on average (about $10.8\epsilon$). If one allows the 20-PPM to make use of both polarizations, the bit rate will double, making the trade-off between power and bit rate close to one-for-one. The comparison shows a direct trade-off between time and energy and each method provides a solution to a different problem.

A modification of M-FSK modulation is to consider bipolar signals on each frequency channel (the receiver must be coherent in this case). Instead of on-off modulation for each channel, all channels transmit simultaneously, meaning that the signals are no longer temporally orthogonal. Each channel can carry 1 bit of information by antipodally phase-modulating its carrier [or 2 bits with quadrature phase modulation, though we have assumed that the latter is more generally expressed as a 4-QAM modulation]. The number of states in the constellation is the same as before, namely $2^M$, where M is the number of frequency channels. This system continuously fills the entire bandwidth of $\mathcal{B}=M\times\Delta\tau^{-1}$ Hertz, as does the central example of this discussion. If M=100 and the symbol interval is 1 μs for a total bandwidth of 100 MHz, the bit rate is simply 100 Mb/s. This value, essentially the bandwidth, is an instance of the physical symbol capacity derived above for orthogonal carriers. The corresponding spectral efficiency is 1. If both polarizations are considered, the spectral efficiency doubles to 2.

Code Orthogonality

The presentation of the gigabit-rate communications system thus far has considered only simple symbols to represent points in the modulation constellation. We now consider the possibility of transmitting orthogonal digital codes on each frequency channel. Such codes may be randomly chosen and selected to have small overlap or generated by methods known to produce orthogonal sets such as the Walsh codes. A code is usually defined as a binary sequence of 1s and 0s of a certain length. The base-band signals used for modulation purposes are sequences of $c_k = (-1)^{b_k}$ where $b_k$ is the kth binary digit of the code. Two different codes $\{a_k\}$ and $\{b_k\}$ for $k = \{1, \ldots, m\}$ are orthogonal if $$\Sigma_k (-1)^{a_k} (-1)^{b_k} = 0. \tag{36}$$

Each bit in the code defines a chip of duration $\Delta\tau$, which is the same as the symbol period since the state of the electromagnetic wave is stationary for the duration of the chip.

It is important to note that, although still useful in many applications, the commonly used DS codes such as Gold codes, Kasami codes, and m-sequences are not truly orthogonal with the other members of their respective sets and exhibit noticeable degradations in cross-correlations between coded polynomials, unlike the strictly orthogonal Walsh and related code sets.

Composite States & Direct-Sequence Codes

Define a composite state as a concatenation of physical states with known transitions separating them. For example, a composite state may consist of a carrier modulated by a 16-bit Walsh code, or a multidimensional signal as used in M-dimensional frequency-shift key (M-FSK) or M-PPM modulation techniques. For the 16-bit Walsh code, there are actually 16 states making up the composite state and the PSD of the composite state depends upon the particular code used. The reason for the definition of a composite state is to be able to discuss direct-sequence modulation techniques within the framework developed so far. When assigning DS codes to represent information on a frequency channel, we can allow the code to stand for a QAM state, for example (not a physical state). A simple example in two dimensions would be a 16-state constellation where each state is assigned a different 16-bit Walsh code. If the constellation were a QAM, the quadrature amplitudes could be represented by the amplitudes of the Walsh codes, one on each of the quadrature phases; alternatively, the constellation points or QAM states can each be represented by a Walsh code, all having the same amplitude as long as the number of codes is greater than or equal to the number of QAM states. The analogous phase distinction carried over from the QAM concept would be to consider different codes, each quadrature phase carrying its own code at a particular amplitude, this is a more efficient mapping of codes onto QAM states. For example, if there are 16 available codes and only one amplitude available, there are nevertheless $16^2 = 256$ possible states since each quadrature amplitude can independently carry one of the 16 codes, so the combined DSQAM (direct-sequence [coded] quadrature amplitude-modulation system) symbol corresponds to 8 bits. If two amplitude states for each code are transmitted (and capable of being detected), the number of states is $(2 \times 16)^2$, corresponding to 10 bits. In four dimensions with 16 codes and 2 amplitude states each, there are $(2 \times 16)^4$ or $2^{20}$ states, corresponding to 20 bits of information. Note that an additional 16 states could be transmitted at each quadrature amplitude if the (binary) phase of the code is considered. A system with a mere 8 amplitude states, allowing both 0 and 180° carrier phases in the case of a coherent system, could be made to deal with 32 bits or $2^{32}$ DSQAM states in the four-dimensional case.

The DSQAM idea is a new concept in modulation. The DSQAM idea combines standard QAM techniques with direct-sequence codes. In essence, the DS code is assigned to a state of the modulation constellation and not to a bit state (0 or 1) as is usually done. Standard CDMA communications can be enhanced by this reinterpretation. Each user would have several DS codes, defining a constellation unique to that user.

Let the composite state be represented by a sequence of m pulses each with an arbitrary phase; the state can be written as $$S_c = A \Sigma_k a_k \pi_{\Delta\tau}(t - t_k) e^{2\pi i v_c t + i \phi_c}, \tag{37}$$

where the sum is over the code sequence of length m, $\pi_{\Delta\tau(t-t_k)}$ is a unit pulse of width $\Delta\tau$ centered at the time $t_k$, $a_k = \pm 1$ is the baseband signal corresponding to the code, $v_c$ is the carrier frequency, $\phi_c$ is its phase, and $\mathcal{A} = \mathcal{A}_0 e^{i\phi}$ is the complex amplitude representing the intensity and phase of the quadrature components. Each polarization direction may carry such a composite state. If the receiver is coherent with the transmitter, the state $S_c$ is distinguishable from the state $-S_c$ (the carrier phase can differ from one state to the next).

Figure 17:
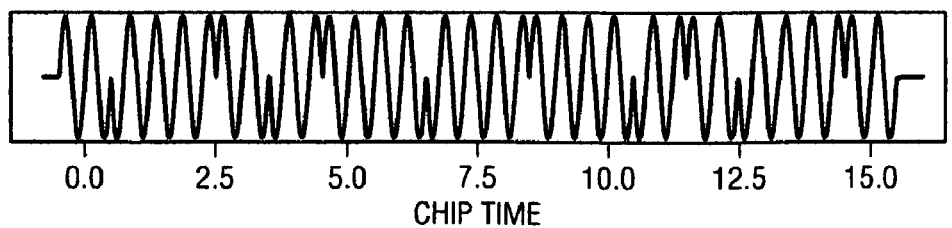
FIG. 17 illustrates a Walsh-code modulated carrier, representing an embodiment of the invention.

FIG. 17 illustrates chip time for a Walsh-Code modulated carrier.

The Fourier transform of the two factors are $$F[a_k \pi_{\Delta\tau}(t - t_k)] = a_k \operatorname{Sinc}[v\Delta\tau] e^{2\pi i v t_k}$$

$$F[e^{2\pi i v_c t + i\phi_c}] \delta(v - v_c) \tag{38}$$

so the spectrum of the state $S_c$ is the convolution $$F[S_C] = \mathcal{A} e^{i\phi_c} \operatorname{Sinc}[\Delta\tau(v - v_c)] \sum_{k=0}^{m-1} a_k e^{2\pi i (v - v_c) t_k} \tag{39}$$

Figure 18:
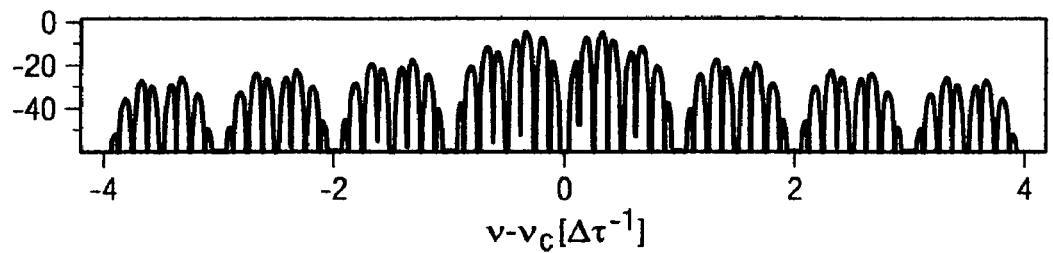
FIG. 18 illustrates the power spectral density of the signal shown in FIG. 17, representing an embodiment of the invention.

The power spectral density of the signal shown in FIG. 17 is given by the absolute value squared of the spectrum; it is shown in FIG. 18.

FIG. 18 illustrates power spectral density in dB of a carrier modulated with the 16th Walsh code given by the sequence $\{1, -1, -1, 1, -1, 1, 1, -1, -1, 1, 1, -1, 1, -1, -1, 1\}$. The abscissa is the frequency difference from the carrier frequency in units of the chip rate. The remaining Walsh codes have spectra differing considerably from this one. The notable constant features are the lobes with envelope period $\Delta\tau^{-1}$ (some codes have periods at half-integer values), the high-frequency component indicative of the carrier frequency, and the overall envelope falling off from nominally 0 dB at the carrier frequency to $-24$ dB at the maxima of the 4th lobes.

Distinction between DSQAM and M-ary Frequency-Shift Keying

The particular example uniting the different threads in this discussion is that of a multi-frequency system where the allotted bandwidth is partitioned into several subcarriers on orthogonal channels. Additionally, we have added QAM constellations to each of the subchannels where each QAM symbol has four dimensions (the four quadrature amplitudes). Some existing systems and several well-known references make use of M-FSK and M-PPM (discussed above). Both of these multidimensional modulation methods divide the signal period into M symbol intervals, where either a single frequency or a single pulse is transmitted, the sequence of M frequencies or bipolar pulses forming the components of the temporally orthogonal signal vectors. There is nothing to prevent the frequency channels or pulse-position channels from carrying multi-amplitude information, thus appearing to be similar to the DSQAM discussed above.

The main distinction between the DSQAM and the two existing M-ary methods concerns signal time and bandwidth. For the M-ary systems, the time to transmit a (composite) symbol representing a point in the constellation (usually the corners of a hypercube) is M×Δτ where Δτ is the transition time between states of the carrier. Parallel to this, the time to transmit the (composite) symbol representing a point in the DSQAM constellation is N×Δτ, where the DS code used has length N. If N=M, then the times are the same for both methods.

Compare the bit rates between the DSQAM, M-FSK, and M-PPM methods given the same dimensions of the multi-dimenional signals as the length of the code word. The number of states for a single-amplitude DSQAM with a code-word of length N is $(2\times N)^n$ for a physical symbol having n dimensions. The number of states for the standard modulation methods is $2^N \times n_p$ where $n_p$ is the number of polarization states (1 or 2) and N is the dimensionality of the signals being transmitted. The logarithm, to the base 2, of the number of states is the number of bits in the signal constellation. For a symbol interval of Δτ, the bit rates are given by dividing the number of bits per constellation point by the time to transmit that information (N×Δτ in all three cases). The resulting bit rates are $$\mathcal{R}_{DSQAM} = \frac{1}{N}(n\ln_2 N + n)\Delta\tau^{-1} \quad (40)$$

$$\mathcal{R}_{FSK} = \left(1 + \frac{1}{N}\right)\Delta\tau^{-1}$$

$$\mathcal{R}_{PPM} = \left(1 + \frac{1}{N}\right)\Delta\tau^{-1}$$

where $\mathcal{R}$ is the bit rate for each of the cases and both polarization states are included. Note that the rate for the DS-QAM is logarithmic and must eventually fall below that of the other two methods. This behavior is illustrated in FIG. 19.

Figure 19:
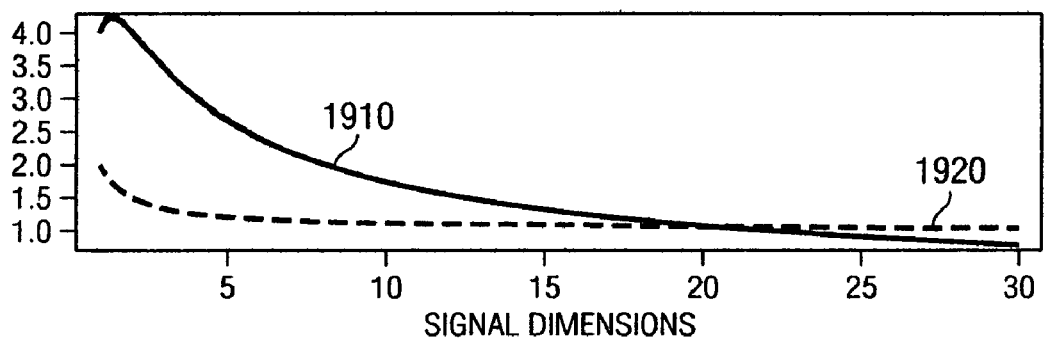
FIG. 19 illustrates spectral efficiency as a function of signal dimensions, representing an embodiment of the invention.

FIG. 19 illustrates a bit-rate or spectral efficiency comparison for the DSQAM (red 1910) and the PPM and FSK methods (green 1920). The abscissa is the code length for the DSQAM and the signal dimensionality for the other multi-dimensional signals. The DS-QAM format shows a bit-rate advantage out to about 21 dimensions where it slowly drops below the other two in performance. The spectral efficiency is in bits per second per Hertz of bandwidth.

This analysis assumes that the channel spacing remains at $\Delta\tau^{-1}$ Hertz. If we make use of the orthogonality property of the codes, the number of channels per Hertz can approach a factor of 4π times this amount and the spectral efficiency would not start to drop until about 12 signal dimensions were employed.

FIG. 19 clearly shows that the DSQAM has a superior spectral efficiency out to about M≈21 dimensions. However, this is only half the story as the performance in the presence of interferes has not yet been presented. It will be shown [later] that the noise performance of the DSQAM is far superior to M-FSK and certainly to the less efficient M-PPM.

Chip & Bit Orthogonality

Commonly used methods of achieving multiuser and multiple-access communication systems make use of various schemes such as code-division multiple access (CDMA), which uses direct-sequence spreading codes; time-division multiple access (TDMA), wherein each user is assigned a particular time slot within a time "frame"; and frequency-division multiple access (FDMA), where each user is assigned a particular frequency subband, non-overlapping with (i.e., orthogonal to) adjacent subbands. Such systems have the capability of "spreading" information over a wider frequency band that those in which the carrier is analog modulated (frequency or amplitude) or controlled via simple digital modulation schemes such as PAM or on-off keying (OOK). CDMA methods automatically provide spectral spreading due to the access code, which also serves as a spreading code. In TDMA, a code would merely provide security to the particular user, as it would not, on average, increase the spectral bandwidth by merely swapping time slots. FDMA can also make use of codes to provide better interference immunity and spread the information over a wider bandwidth. In multiuser or multiple-access systems, the code components or chips may be of several types such as those describing frequency-hopping codes in fast-hopping systems or merely simple state changes (amplitude, phase, polarization) within a single frequency channel. In DSS spectrum (DSSS) parlance, a "chip" is usually thought of as one of a sequence of stationary states wherein each chip in the sequence can have a different phase; normally, the phases differ by π radians. The concept of a chip as a generic change-of-state, extending the direct-sequence modulation or coding to amplitude states and polarization states is new; in particular, the idea of a chip as a change of state of the polarization is introduced here for the first time.

Figure 20:
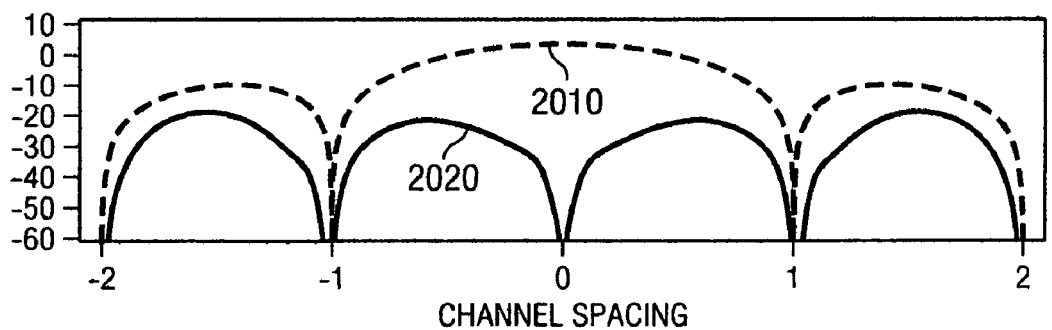
FIG. 20 illustrates spectral leakage power in dB as a function of channel spacing, representing an embodiment of the invention.

Since concept of a chip is extended to be equivalent to a state or symbol, the spectrum of a single chip of duration Δτ is precisely that shown in FIG. 16. When the channel spacing is $\Delta\tau^{-1}$, chips on adjacent channels are orthogonal and hence non-interfering. If the multiple-channel system is not coherent in that chips may start at different instances on different channels, then orthogonality may be lost as shown above. The question now arises whether the introduction of DSS codes that are orthogonal between channels can enhance orthogonality such that the relevant time for the matched-filter detection is the bit time rather than the chip time. A practical consequence of such a situation would be that the bit rate would not necessarily be reduced by a factor equal to the number of chips in a bit or composite symbol as would happen if the channel coherence time were maintained at Δτ but the bit or chip time were m×Δτ for m chips. That is, can the channel spacing reflect a bandwidth closer to the bit time? If so, much more information could be packed into a given allotted bandwidth. Applying the reciprocity theorem to this case, it is easy to see that a bit consisting of more than 4π chips would have a spectral width narrower than allowed by channel orthogonality. FIG. 20 illustrates this case, showing spectral leakage from adjacent channels carrying orthogonal codes.

FIG. 20 illustrates spectral leakage into a center channel from two adjacent channels of equal power spaced either side in units of $\Delta\tau^{-1}$. The blue trace 2010 is for symbol leakage, the red trace 2020 is for orthogonal code leakage.

As the neighboring channels approach the channel of interest, their signals look more and more like the signal tuned to the matched filter and the output of the matched filter rises accordingly. However, if the neighboring channels are coded with orthogonal sequences (16-bit Walsh codes with a time span of $16\Delta\tau$ were used here), as the channels start to merge, the code orthogonality begins to dominate and the filter output drops as shown by the red trace. Codes with lengths longer than 16 would have correspondingly less spectral leakage than shown above. Additive noise would have the effect of filling in the spectral nulls in both cases above. Note that the physical-symbol capacity limit prevents the channel spacing from approaching zero closer than the reciprocal of $4\pi\Delta\tau$ if we really are to make full use of multiple frequency channels.

Basing channel spacing on the bit period has two drawbacks. The first drawback is that the channel spacing is limited in any case by the reciprocity relation of Eq. 10; the second drawback is illustrated above in FIG. 20, which shows spectral contamination at a level of 20 to 29 dB below the in-channel signal. If this equivalent noise is acceptable, then the channels can indeed be moved closer together, but not quite to the hoped-for goal of the reciprocal bit time.

APPLICATIONS

Introduction

Above we discussed physical channel capacity, probabilistic and geometrical interpretation of error rates, and channel orthogonality and overlap. The goal for this section is to apply the general discussions on capacity, error rates, and coding symbols to specific instances of n-QAMs and n-DSQAMs in two, three, and four dimensions.

Practical devices are always bandlimited and always require a finite time to complete a measurement. These are the only restrictions—in principle—for a practical device. Given the physics of electromagnetic waves and restricting the discussion to practical devices of limited bandwidth, finite measurement times, and—for now—electric field antennas, what can we do to maximize the transmission rate of information between two points? A good answer has enormous practical consequences. We will not be concerned with designing devices at this stage, but with adapting the principles derived above to practical situations that can result in device designs. This is the step between theory and practice, and might be termed applied physics or theoretical engineering.

Some guiding principles will be to consider current practice in transmitter and receiver design and to choose practical values for the physical parameters of $\Delta\tau$ and $\Delta\nu$ that are consistent with current practice, noting that we can always push the envelope and seek to go beyond the state-of-the-art. Another restriction has already been noted: signal orthogonality in adjacent frequency bands requires that the reciprocity limit be 1 instead of $\frac{1}{4}\pi$. Thus, orthogonality is a constricting constraint. Below, we show in a practical example that 20 bits per symbol are required to approach the information capacity in a given situation that must make use of frequency subchannels because of physical constraints on the hardware. If this multiple-channel restriction were relaxed, a mere 2 bits per symbol would suffice, a difference that essentially comes about by taking the full physical capacity of $4\pi\mathcal{B}$ instead of simply $\mathcal{B}$.

Frequency Diversity

Introduction

The use of a closely spaced set of carrier frequencies has several advantages over a single carrier spread over a wide band, even though there may be a heavy cost in hardware complexity and loss of symbol capacity. Most notable among these is the practical advantage of processing speed at the receiver: a single band $\mathcal{B}$Hertz wide requires something on the order of $\mathcal{B}^{-1}$ seconds to decode a single symbol whereas dividing that band into n subbands means that $n\mathcal{B}^{-1}$ seconds for each subband is sufficient. If the bandwidth is 100 MHz, this classic example of divide-and-conquer turns an impractical scheme requiring a symbol to be detected, identified, and classified in a mere 10 ns into a practical receiver based on parallel channels, say 100, each taking 1 µs for the same task, allowing hardware that is 100 times slower.

Another advantage of subband division is the possibility of overcoming multipath losses by redundantly transmitting information on different subchannels such that the multipath spectral nulls overlap at several chosen frequencies assuring that at least one of the channels carrying the redundant information is of sufficient strength to be reliably detected.

A third advantage is that orthogonal DS codes can be used on each of the subbands, providing additional processing gain (at the expense of hardware complexity and decreased bandwidth).

Orthogonal Channels

Let the band $\mathcal{B}$Hertz wide be divided into n channels of width $\Delta\nu$ Hertz each. The overlap integral between two adjacent channels separated by $\Delta\nu$ averaged over the symbol-determination period $\Delta\tau$ is given by $$\frac{1}{\Delta\tau}\int_{-\Delta\tau/2}^{\Delta\tau/2}\sin\left(2\pi t\left(\nu-\frac{\Delta\nu}{2}\right)=\phi\right)\sin\left(2\pi t\left(\nu+\frac{\Delta\nu}{2}\right)\right)dt = \qquad(41)$$

$$\cos(\phi)\left(\frac{1}{2}\mathrm{sinc}(2\Delta\tau\nu)\right).$$

The second term is bounded by $\frac{1}{2}(\pi\Delta\tau\nu)^{-1}$ which is about 14 parts per million for the case of 1 µs observation times and 5.775 GHz; the first term is bounded by $\frac{1}{2}$. However, if $\Delta\nu\Delta\tau$ is an integer, the first sinc function is zero. Thus, the channels are orthogonal to within 14 parts per million in the worst case if we take $\Delta\nu\Delta\tau$ to be an integer. If the transmitter has phase control over each of the n channels, a method to ensure orthogonality is to offset each channel in phase by 90° from its two neighbors. In this case, the cosine term is zero and adjacent channels are orthogonal. It turns out that any two channels phase-shifted by an odd multiple of $\pi/2$ are orthogonal. This holds independently of any relationship between $\Delta\nu$ and $\Delta\tau$. Orthogonality will be maintained at the receiver if there is no phase dispersion in the transmission channel and the receiver has adequate phase definition and stability.

Multipath Considerations

Figure 21:
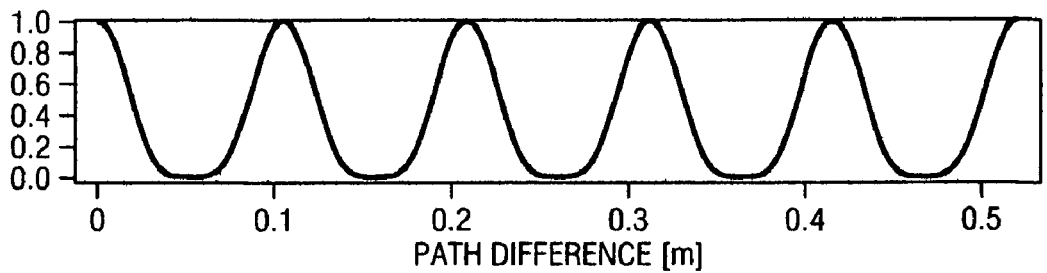
FIG. 21 illustrates multipath beats (at 5775 MHz) as a function of path difference in meters, representing an embodiment of the invention.

The first look at multipath suggests that one simply partition the n frequency channels into two halves of n/2 channels each and transmit redundant information in each half. Suppose there are two main paths from transmitter to receiver (one may be a direct line-of-sight while the other may be a reflection from a building or other obstacle). The fields reaching the receiver along the two different paths will have a phase difference that is the speed of light divided by the path difference. Referring to FIG. 21, the envelope of the field intensity for a 5775 MHz carrier interfering with a single reflection of equal intensity appears as a sequence of nulls and maxima as a function of the path difference with a complete oscillation about every 100 cm. Travelling through such a pattern at a rate of a few meters per second would create an intensity oscillation of a few tens of Hertz, resulting in data loss or highly objectionable audio reception. If the same information is transmitted on another frequency channel, the maxima of one channel can be made to appear at the nulls of the other, depending on the multipath difference and the channel separation.

Figure 22A:
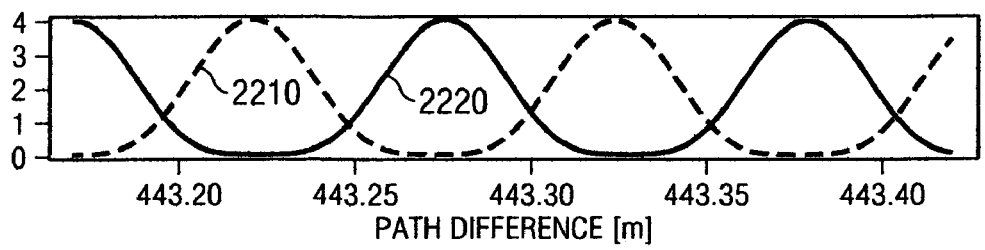
FIGS. 22A and 22B illustrate multipath beats (at a frequency difference of 2 MHz in FIG. 22A and a frequency difference of 10 MHz in FIG. 22B), representing an embodiment of the invention.
Figure 22B:
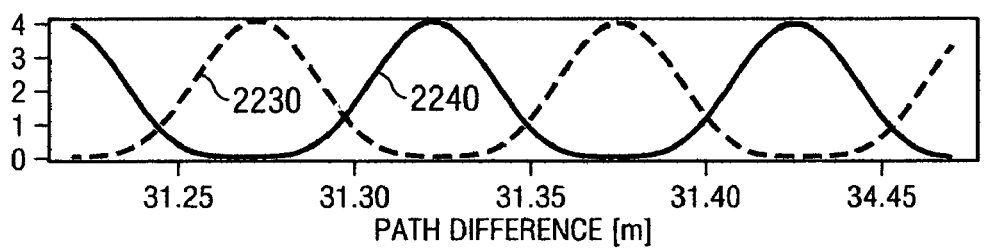

FIGS. 22A and 22B illustrate two examples where the fading of one channel (shown in blue 2210, 2230) is partially compensated by the presence of the other (purple trace 2220, 2240). Referring to FIG. 22A, for the 5.8 GHz band, a difference of about 443 meters can be overcome by transmitting on two channels separated by 2 MHz. Referring to FIG. 22B, if the path difference were about 32 meters, a 10 MHz separation would be required. Of course, the same information can be transmitted on three channels instead of two, allowing the gaps between the peaks shown above to be filled in. An agile system that can adapt to changing path differences by adjusting the channel spacing, perhaps by using a pilot channel for the receiver to inform the transmitter of the current status, can largely compensate for multipath losses.

Chips, Bits, and Codes

Introduction

Suppose we now want to interpret our symbols as groups of chips—nothing changes in the physical signals being transmitted, but we have a new possibility. Since a certain grouping of chips is now interpreted as a comprising a bit, the idea of joint detection offers the possibility of increased robustness against noise-induced errors. The main goal in this section is to devise a means of partitioning the several chips optimally amongst the constellation points. Of course, the effective bit rate obtained by reinterpreting bits as consisting of m chips is reduced by a factor of m. From an error standpoint and a spectral-spreading standpoint, the trade-off might be worthwhile in particular cases. The cost does seem severe, however, as a 16-chip Walsh code slightly decreases the bit-error rate and provides a process gain of 12 dB, but the cost is a 16-times lower overall data rate in the worst case. If the multiple channels used by the transmitter and receiver are close together, then the spectral spreading could actually increase the error rate. Another goal of this section is to find an optimum channel spacing for a given spreading factor (chips per bit).

Most of the discussion in this section refers to 16-bit Walsh codes. These codes are orthogonal, simple to generate, and provide a processing gain of close to 12 dB.

Orthogonal Codes

The use of orthogonal spreading codes has four benefits that can impact system performance:

1. Process gain from spreading codes can provide some immunity from interferers as well as help the system meet certain FCC legal requirements.
2. In the case of using both polarizations to achieve a full 3-D or 4-D system, different members of an orthogonal set can be used on each of the four quadrature channels, thus increasing the robustness against slight antenna misalignments.
3. If the codes are varied so that adjacent frequency channels do not contain the same codes (at least at the same times), the effective noise from overlapping channel interference can be reduced (this is similar to the usual process-gain argument).
4. If 4 different codes are used for each of the four different quadrature amplitudes on a particular frequency channel, the system will have greater robustness against quadrature phase errors in the receiver.

The contribution from each of these benefits can be calculated in a particular case.

The most efficient use of orthogonal codes is to map a code word onto each QAM point, effectively forming the DSQAM defined above. This has the advantage that a d-dimensional QAM has $(2 \times n_c \times n_s)^d$ states, where $n_c$ is the length of the code and $n_s$ is the number of amplitude states. The factor of 2 reflects the case of coherent detection for biorthogonal codes. Suppose we have 16 orthogonal codes and 16 amplitude states for each. The number of states in 2 dimensions is $(2 \times 16 \times 16)^2 = 2^{18}$ so the DSQAM is represented by 18 bits. In four dimensions, the corresponding DSQAM has $(2 \times 16 \times 16)^4 = 2^{36}$ states or 36 bits.

The detector identifies both the power or amplitude in a Walsh code as well as the code itself on each of the quadrature amplitudes. Take a particular frequency channel: there are two quadrature amplitudes belonging to each polarization and four independent Walsh codes can be extracted; each polarization can transmit two Walsh codes each at a different amplitude. This preserves the 4-D nature of each frequency channel. Since we are transmitting and detecting codes, the concept of SNR per symbol and not per bit is the valid method of comparison.

The price that must be paid for sending codes is that the (composite) symbol rate drops by a factor $n_c$. For the example below with a 100-MHz bandwidth in the ISM band, the uncoded bit rate is 2000 Mb/s, just below the Shannon channel capacity. If we now use 16-bit Walsh codes with 16 amplitude levels in a four-dimensional DSQAM, the bit rate is:

$$36 \frac{\text{bits}}{\text{code}} \times \frac{10^8 \text{ symbols/second}}{16 \text{ symbols/code}} = 225 \text{ Mb/s}. \tag{42}$$

The cost of using the code is then a factor of 8.9 in bit rate, or about 9.5 dBb. The processing gain of about 12 dB due to the 16-bit code words more than makes up for this loss of bit rate, but it is only meaningful in a high-noise environment. That is, the use of orthogonal codes makes sense only where the signal-to-noise ratio is less favorable than for the low-noise case and bit rate must be reduced significantly to compensate for the increased noise.

Design Example: Power Budget

Specification

For this example, the transmitter operates in the ISM band in the range between 5725 and 5825 MHz with a bandwidth of 100 MHz. The total power at the transmitter is 1 watt. The antennas are 3-meter parabolic dishes spaced 35 km apart. What is the maximum bit rate that can be transmitted at a symbol-error rate of $10^{-5}$? How much link margin is available? Finally, how gracefully can the system adjust to increasing noise and decreased power at the receiver?

Antenna Gains

The receiving antenna has a gain given by $$G_R \to \eta\left(\frac{\pi D}{\lambda}\right)^2, \quad (43)$$

where D is the dish diameter, $\lambda$ the wavelength, and $\eta$ the illumination efficiency factor (usually between 0.5 and 0.6). While the 3-dB beamwidth of a parabolic dish in degrees is $$\Theta_B \to 70\frac{\lambda}{D}, \quad (44)$$

so the transmitter antenna gain becomes $$G_T \to \left(70\frac{\lambda}{D}\right)^{-2}, \quad (45)$$

when the angle is converted to radians. For the present example, these gains are $$G_T \approx 33.5 \text{ dB and } G_R \approx 42.2 \text{ dB}. \quad (46)$$

Free-Space Losses & Power at Receiver

The free-space loss is a geometrical factor depending on the square of the ratio of the wavelength to the distance between the antennas and is given by $$\mathcal{L}_{fs} \to \left(\frac{\lambda}{4\pi d}\right)^2. \quad (47)$$

For the frequency and distance given above, this loss is $$\mathcal{L}_{fs} \approx 138.6 \text{ dB}, \quad (48)$$

so the power at the transmitter is the algebraic sum of the transmitter power (0 dBW), the antenna gains, and the free space losses, or $$\mathcal{P}_R \approx 0 \text{ dBW} + 33.5 \text{ dB} + 42.2 \text{ dB} - 138.6 \text{ dB} \approx -62.9 \text{ dBW}. \quad (49)$$

Bit Rate & Receiver Noise

The performance of a digital communication system [Proakis[13], p. 317-18] is specified by the signal-to-noise ratio per bit $\epsilon b/N_0$ required to maintain the error-rate performance below some given value. The ratio of the energy in the received bit to the spectral density of the noise at the receiver is $$\frac{\varepsilon_b}{N_0} = \frac{T_b P_R}{N_0} = \frac{1}{R}\frac{P_R}{N_0}, \quad (50)$$

where $T_b$ is the time for a single bit and $\mathcal{P}_R$ the power; the product is $\epsilon b$, is the energy in the received bit, and $\mathcal{R}$ is the reciprocal time per bit or bit rate. Rewriting the above as $$\frac{P_R}{N_0} = R\left(\frac{\varepsilon_b}{N_0}\right)_{req} = R\gamma_{req} \quad (51)$$

gives the signal-to-noise ratio at the receiver as a product of the bit rate and the SNR per bit, $\gamma$, required to identify a bit. The achievable bit rate, in dB, is $$R = P_R - N_0 - \gamma_{req} \quad (52)$$

which is the relation between the bit rate and the power budget.

The power spectral density of noise in the receiver is Boltzmann's constant times the effective temperature. A typical temperature at the frequencies of interest is 300° K and Boltzmann's constant, in appropriate units, is $1.38 \times 10^{-23}$ W/Hz/° K, so the noise power is $$N_0 \approx 4.14 \times 10^{-21} \text{ W/Hz}, \quad (53)$$

which is about −203.8 dBW/Hz.

Channel Capacity

The maximum bit rate must conform to Shannon's channel capacity in the following sense. First, consider the power at the receiver determined by the transmitted power, the free-space losses, and the antenna gains. Since the atmosphere is quite transparent at the frequencies of interest, absorption due to atmospheric losses and possible obstructions are not included in this initial capacity calculation. The noise at the receiver is essentially the spectral power density due to the effective temperature. The channel capacity is then calculated in the usual way as $$C_b = B\ln_2\left(1 + \frac{P_R}{BN_0}\right), \quad (54)$$

where $\mathcal{B}$ is the bandwidth, $\mathcal{P}_R$ is the power at the receiver, and $N_0$ is the power spectral density of the receiver noise. If the power at the receiver is (above) −62.9 dBW or 0.513 µW and the spectral density of the receiver noise is $4.14 \times 10^{-21}$ W/Hz\) as above, then the Shannon channel capacity for the system as a whole is $$C_b \approx 2024 \text{ Mb/s}. \quad (55)$$

Before computing the power budget, we need to know the SNR in dB per bit transmitted. This entails knowing the number of bits per symbol or the specifics of the constellation for multi-bit symbols. Here, we make use of the physical channel capacity in symbols per bit per Hertz, which is the expression derived above. For a 100 MHz bandwidth, this capacity, assuming the restriction due to orthogonal frequency channels, is $$C_s = \mathcal{B} = 100 \text{ Ms/s}. \quad (56)$$

The ratio of the information channel capacity in bits to the physical capacity in symbols gives the minimum number of bits per symbol needed to optimize the data rate. In this case it is somewhat over 20 bits per symbol, so the minimum number of (integer) bits per symbol, assuming a uniform allotment, is $n_b = 20$. With this many bits per symbol, the system, under favorable conditions, can achieve a transmission rate arbitrarily close to the information capacity of 2024 Mb/s. Note that it would be a waste of power and a useless expense of design effort and hardware cost to build a system with more bits per symbol than inferred from the ratio of $C_b$ to $C_s$.

Link Margin & Graceful Degradation

If we are interested in budgeting for the data rate of 2 Gb/s (93.0 dBb) which is close to the channel capacity, know from the calculations above that the power at the receiver is −62.9 dBW and from the error-rate calculations that $\gamma_{req}$ for a $\mathcal{S\epsilon R}$ of $10^{-5}$ is 26.7 dB, then the excess capacity of the system available for atmospheric losses, receiver inefficiencies, and in-band interferers (i.e., the "link margin") is given by $$M\mathcal{L}_{\rightarrow}\mathcal{P}_R - N_0 - \gamma_{req} - R \quad (57)$$

or, substituting the particular values, the link margin turns out to be a healthy 24.5 dB. Of course, if any of this margin is "used up" in excess noise or atmospheric loss (or other drop in power at the receiver), the bit rate will correspondingly drop as can be computed from the channel capacity.

What are the preferred methods to lower the bit rate? The goal is to achieve graceful degradation of the transmission service. If the measurement time is increased, there is wasted spectrum between channels unless their number is increased, which increase would necessitate an additional hardware reserve for such a situation. For example, doubling the time from 1 μs to 2 μs and decreasing Δν from 1 MHz to 0.5 MHz increases the number of channels from 100 to 200. The symbol rate remains constant at 200/2 μs=100/1 μs if the channel orthogonality is maintained. Clearly this will not work. The only free parameter we have is the number of bits per symbol. This parameter does not need to change by integers since the effective QAMs do not have sizes that are powers of 2. As the link margin is consumed by signal loss or channel noise, the constellation size can be correspondingly reduced, allowing for a graceful degradation of the service. The physical changes in the transmitter and receiver are most effectively made in software that partitions the amplitude states.

Figure 23:
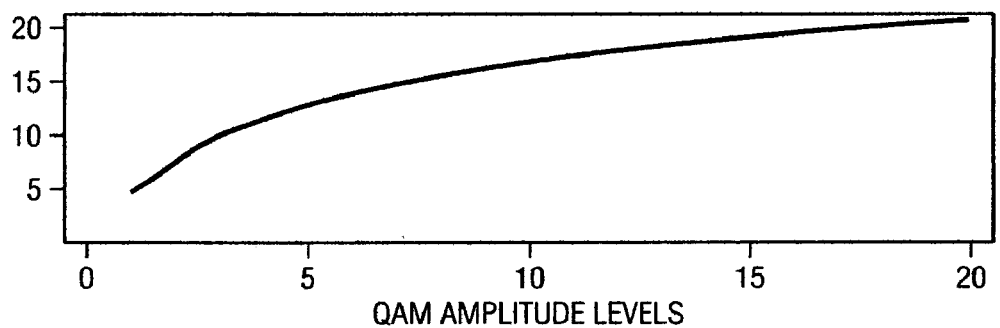
FIG. 23 illustrates 4-dimensional spectral efficiency as a function of QAM amplitude levels, representing an embodiment of the invention.
Figure 24:
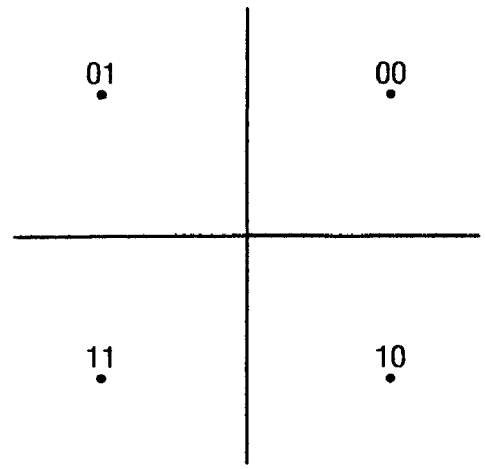
FIG. 24 illustrates a conventional QPSK or 4-QAM constellation (2 bits per symbol), appropriately labeled "PRIOR ART."
Figure 25:
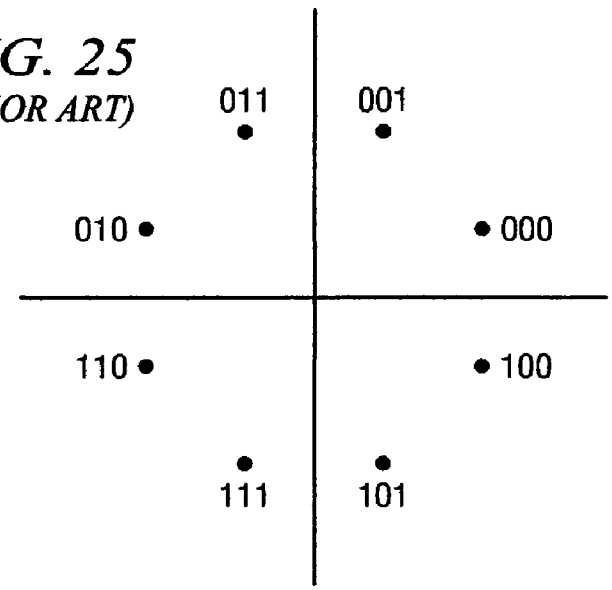
FIG. 25 illustrates a conventional Trellis coded 8-PSK constellation (3 bits per symbol), appropriately labeled "PRIOR ART."

FIG. 23 illustrates the spectral efficiency of the 4-D QAM as a function of amplitude levels. A spectral efficiency of 20 bits per second per Hertz requires about 18 discrete amplitude levels. Since the bandwidth is 100 MHz, the bit rate for that case would be 2000 Mb/s. At a 1000 Mb/s rate, the link requires a spectral efficiency of 10 bits per second per Hertz and can be achieved with between 3 amplitude levels (9.87 bits) and 4 amplitude levels (11.34 bits). These amplitude levels are easy to obtain with present-day hardware. The full 18 levels required for the 20-bit spectral efficiency is more problematic. FIG. 23 shows spectral efficiency in bits per second per Hertz of a 4-D QAM as a function the number of levels required in each of the four quadrature-detector sets.

Restating the above results, graceful system degradation in the presence of noise is a desirable feature of any communications system. For the present example, the system can operate from 2000 Mb/s (near the Shannon limit) down to any desired rate by reconfiguring amplitude-partition maps.

Suboptimal Channel Spacing

Suppose the chip rate is 1 MHz so there is a symbol on each channel every 16 μs. Every 16 μs there are 2400 bits sent out for a total of 150 Mb/s, which is essentially the same as above. The way to get larger throughput is to increase the number of amplitude states to 8, say. If this is done, and the same chip rate of 1 MHz is kept, the total rate is 175 Mb/s. This is equivalent to an 8×8 QAM in the quadrature states.

Going to 16 amplitude states gives 32 bits per symbol or 200 Mb/s. The Shannon limit is still 2 Gb/s with the 1 watt, 3-m dish antennas, and 35 km parameters (in clean, dry air); can we still approach this limit? The only parameter left is the channel spacing which was fixed at $\Delta\tau^{-1}$ due to orthogonality constraints. If we are willing to accept contamination from all adjacent channels at the maximum level of about −20 dB for 16-bit orthogonal codes on adjacent channels, then we can use a much closer channel spacing than given by $\Delta v = \Delta\tau^{-1}$. Depending on the amount of additive Gaussian noise, we can approach the theoretical spacing given by the reciprocity relation of Eq. 10. In this case, the contamination from all interfering channels would be approximately −15 dB. The question is then one of the effects of additive Gaussian noise at the receiver, which must be estimated for the particular design.

Supposing that the signals are reasonably noise-free so that the reciprocity limit can be approached, the number of channels increases from $\mathcal{B}/\Delta v$ to a maximum of approximately $$n_{\max} \leq \frac{4\pi\mathcal{B}}{\Delta v} \quad (58)$$

In the case of DSQAM modulation with 16-bit Walsh codes reserving orthogonal sets of 8 each for adjacent channel, the spectral efficiency of a single channel is $4+4\ln_2 n_s$ where $n_s$ is the number of amplitude states for the codes. If the bandwidth is $10^8$ Hertz, the bit rate is $$\frac{1}{16}(4 + 4\ln_2 8) \times 4\pi \times 10^8 \approx 1257 \text{ Gb/s} \quad (59)$$

for 8 amplitude states available for each Walsh code. The particular form of the codes used, whether 4-D QAMs or simple assignment of states to quadrature-amplitude levels (analogous to standard multidimensional signals), depends on the expected system noise. In any case, the bit rate in dB is approximately 91. If the required rate is 1 Gb/s (90 dB), then there is only 1 dB of margin to expend on the limit not being quite $4\pi$, bringing it closer to $3.2\pi \approx 10$.

For a chip rate of 40 MHz, the canonical channel width is 40 MHz and close spacing would produce a maximum of about 31 overlapping channels spaced some 3.2 MHz apart. A 1 Gb/s rate could then be achieved with about 25 channels having a slightly larger spacing and allowing for a few MHz guard bands at each end of the system bandwidth. This set of parameters seems not unreasonable for a realistic system.

HYPERCUBES AND THE OPTIMUM DIMENSION—PROOF OF 4-D OPTIMALITY

The corners of an n-dimensional hypercube are located at $\{\pm 1, \ldots, \pm 1\}$ where there are n components in the vector. The distance from the origin to any corner is obtained from the usual expression as $$d = \sqrt{(\pm 1)^2 + \ldots + (\pm 1)^2} = \sqrt{n}. \quad (60)$$

Place unit-radius hyperspheres at each of the $2^n$ corners. At the origin, place a hypersphere with radius $\sqrt{n}-1$. This central hypersphere touches all $2^n$ corner hyperspheres on the side towards the center of the hypercube. The radius of the central hypersphere is, 0, $\sqrt{2}-1 \approx 0.414$, and $\sqrt{3}-1 \approx 0.732$ in dimensions 1, 2, and 3. In four dimensions, the radius is 1, the same as that of the corner hyperspheres. In dimensions greater than 4, the central sphere has radius greater than 1. Thus, if we require that a central hypersphere have radius 1, the same as the corner hyperspheres, for dimensions less than 4, the centers must be pushed outward so that they lie outside of the binary hypercube. For dimensions greater than 4, the centers must be pulled inward so that they lie within binary hypercube. Four dimensions is unique in this sense and may be termed "cozy."

The above argument is a variation on the standard proof of a very bizarre feature of hypercubes. Consider the hypercube that contains all $2^n$ unit hyperspheres placed at the corners of a binary hypercube. Its faces lie a distance of 2 from the origin for every n. In less than 8 dimensions, the central sphere that touches all corner spheres lies inside this bounding hypercube. For 9 dimensions, the central hypersphere just touches the inside 'walls' of the bounding hypercube ($\sqrt{9}-1=2$). For more than 9 dimensions, the inside hypersphere protrudes out of the bounding hypercube.

While not being limited to any particular performance indicator or diagnostic identifier, preferred embodiments of the invention can be identified one at a time by testing for the presence of low error rates. Preferred embodiments of the invention can also be identified one at a time by testing for robustness against (RF) interference. Preferred embodiments of the invention can also be identified one at a time by testing for resistance against cross talk between the carriers. The test(s) for the presence of low error rates, robustness against (RF) interference and/or resistance to crosstalk can be carried out without undue experimentation by the use of a simple and conventional error rate experiment.

The invention can also be included in a kit. The kit can include some, or all, of the components that compose the invention. The kit can be an in-the-field retrofit kit to improve existing systems that are capable of incorporating the invention. The kit can include software, firmware and/or hardware for carrying out the invention. The kit can also contain instructions for practicing the invention. Unless otherwise specified, the components, software, firmware, hardware and/or instructions of the kit can be the same as those used in the invention.

The term spread, as used herein in the context of a domain, is defined as a time expanded concatenation or simultaneous grouping of a fundamental modulation technique of a classical physical dimension such as amplitude, frequency, phase and/or polarization and which represents bits and/or signal information states (more generically constellations) by a sequence or grouping of modulation states.

The terms a or an, as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically. The term approximately, as used herein, is defined as at least close to a given value (e.g., preferably within 10% of, more preferably within 1% of, and most preferably within 0.1% of). The term substantially, as used herein, is defined as largely but not necessarily wholly that which is specified. The term generally, as used herein, is defined as at least approaching a given state. The term deploying, as used herein, is defined as designing, building, shipping, installing and/or operating. The term means, as used herein, is defined as hardware, firmware and/or software for achieving a result. The term program or phrase computer program, as used herein, is defined as a sequence of instructions designed for execution on a computer system. A program, or computer program, may include a subroutine, a function, a procedure, an object method, an object implementation, an executable application, an applet, a servlet, a source code, an object code, a shared library/dynamic load library and/or other sequence of instructions designed for execution on a computer or computer system.

All the disclosed embodiments of the invention disclosed herein can be made and used without undue experimentation in light of the disclosure. The invention is not limited by theoretical statements recited herein. Although the best mode of carrying out the invention contemplated by the inventor(s) is disclosed, practice of the invention is not limited thereto. Accordingly, it will be appreciated by those skilled in the art that the invention may be practiced otherwise than as specifically described herein.

Further, the individual components need not be combined in the disclosed configurations, but could be combined in virtually all configurations. Further, variation may be made in the steps or in the sequence of steps composing methods described herein. Further, although the transmitter and/or receiver described herein can be a separate module, it will be manifest that the transmitter and/or receiver may be integrated into the system with which it is (they are) associated. Furthermore, all the disclosed elements and features of each disclosed embodiment can be combined with, or substituted for, the disclosed elements and features of every other disclosed embodiment except where such elements or features are mutually exclusive.

It will be manifest that various substitutions, modifications, additions and/or rearrangements of the features of the invention may be made without deviating from the spirit and/or scope of the underlying inventive concept. It is deemed that the spirit and/or scope of the underlying inventive concept as defined by the appended claims and their equivalents cover all such substitutions, modifications, additions and/or rearrangements.

The appended claims are not to be interpreted as including means-plus-function limitations, unless such a limitation is explicitly recited in a given claim using the phrase(s) "means for" and/or "step for." Subgeneric embodiments of the invention are delineated by the appended independent claims and their equivalents. Specific embodiments of the invention are differentiated by the appended dependent claims and their equivalents.

REFERENCES

1. Michael R. Andrews, Partha P. Mitra, Robert deCarvalho, "Tripling the capacity of wireless communications using electromagnetic polarization," *Nature*, 409, pages 316-318, 2001.
2. Harold S. Black, *Modulation Theory*, D. Van Nostrand, 1954.
3. Max Born and Emil Wolf, *Principles of Optics*, 6th Edition, Cambridge University Press, 1993.
4. Thomas M. Cover and Joy A. Thomas, *Elements of Information Theory*, John Wiley & Sons, 1991.
5. Robert C. Dixon, *Spread Spectrum Systems with Commercial Applications*, $3^{rd}$ Edition, John Wiley & Sons, 1994.
6. Khaled Fazed and Ghrhard P. Fettweis, Editors, *Multi-Carrier Spread Spectrum*, Kluwer Academic Publishers, 1997.
7. David W. Kammler, *A first course in Fourier Analysis*, Prentice Hall, 2000.

8. Heinrich Meyr and Gerd Ascheid, *Synchronization in Digital Communications,* John Wiley & Sons, 1990.
9. Heinrich Meyr, Marc Moeneclaey, Stefan A. Fechtel, *Digital Communication Receivers,* John Wiley & Sons, 1998.
10. Partha P. Mitra and Jason B. Stark, "Nonlinear limits to the information capacity of optical fibre communications," *Nature,* 411, pages 1027-1030, 2001.
11. Peyton Z. Peebles, Jr., *Digital Communication Systems,* Prentice-Hall, 1987.
12. Roger L. Peterson, Rodger E. Ziemer, David E. Borth, *Introduction to Spread-Spectrum Communications,* Prentice Hall, 1995.
13. John G. Proakis, *Digital Communications,* Fourth Edition, McGraw Hill, 2001.
14. Eric W. Weisstein, *CRC Concise Handbook of Mathematics,* CRC Press, 1999.

What is claimed is:

1. A method, comprising;
modulating a signal in a first domain selected from the group consisting of phase, frequency, amplitude, polarization, and spread;
modulating the signal in a second domain selected from the group consisting of phase, frequency, amplitude, polarization, and spread;
modulating the signal in a third domain selected from the group consisting of phase, frequency, amplitude, polarization, and spread; and
transmitting the modulated signal,
wherein modulating the signal in the first domain, modulating the signal in the second domain and modulating the signal in the third domain defines a three dimensional orthogonal symbol constellation selected from the group consisting of face-centered cubic spheres and hexagonal close-packed spheres, each sphere having 12 nearest neighbors, and
wherein the three dimensional orthogonal symbol constellation includes an origin at $\{0,0,0\}$ containing a center sphere characterized by zero power transmitted.

2. The method of claim 1, wherein modulating the signal in the first domain includes phase modulation, modulating the signal in the second domain includes amplitude modulation and modulating the signal in the third domain includes spread modulation.

3. The method of claim 1, wherein modulating the signal in the third domain includes a constant envelope technique.

4. The method of claim 1, wherein each state of the three dimensional orthogonal symbol constellation is assigned to a particular, distinct direct-sequence spreading code.

5. The method of claim 1, wherein the three dimensional orthogonal symbol constellation provides a maximum symbol-to-error ratio for a given average signal power.

6. The method of claim 1, wherein the three dimensional orthogonal symbol constellation has a packing fraction of approximately 0.7405.

7. A method, comprising:
modulating a signal in a first domain selected from the group consisting of phase, frequency, amplitude, polarization, and spread;
modulating the signal in a second domain selected from the group consisting of phase, frequency, amplitude, polarization, and spread;
modulating the signal in a third domain selected from the group consisting of phase, frequency, amplitude, polarization, and spread;
modulating the signal in a fourth domain selected from the group consisting of phase, frequency, amplitude, polarization, and spread; and
transmitting the modulated signal,
wherein modulating the signal in the first domain, modulating the signal in the second domain, modulating the signal in the third domain, and modulating the signal in the fourth domain defines a four-dimensional orthogonal symbol constellation of face-centered cubic hyperspheres, each hypersphere having 24 nearest neighbors, and
wherein the four-dimensional orthogonal symbol constellation includes an origin containing a center sphere characterized by zero power transmitted.

8. The method of claim 7, wherein each state of the four-dimensional orthogonal symbol constellation is assigned to a particular, distinct direct-sequence spreading code.

9. The method of claim 7, wherein the four-dimensional orthogonal symbol constellation provides a maximum symbol-to-error ratio for a given average signal power.

10. The method of claim 7, wherein the four-dimensional orthogonal symbol constellation has a packing fraction of $\pi^2/16$.

11. The method of claim 7, wherein modulating the signal in the third domain includes a constant envelope technique.

12. The method of claim 7, wherein the four-dimensional orthogonal modulating symbol constellation includes mapping the four rectangular coordinates to four quadrature amplitudes, one pair on each of two orthogonal antennas, according to the equations:

$$S_0 = a^2 = b^2;\ S_1 = S_0 \sin\psi \sin\phi \cos\theta,\ S_2 = S_0 \sin\psi \sin\phi \sin\theta,\ S_3 = S_0 S_0 \sin\psi \cos\theta;\text{ and}$$

$S_4 = S_0 \cos\psi$, where $\{\psi\phi\theta\}$ are hyperspherical angles in accord with Poincaré spherical angles $\theta$ and $\phi$ in three dimensions.

13. A method, comprising:
modulating a signal in a first domain selected from the group consisting of phase, frequency, amplitude, polarization, and spread;
modulating the signal in a second domain selected from the group consisting of phase, frequency, amplitude, polarization, and spread;
modulating the signal in a third domain selected from the group consisting of phase, frequency, amplitude, polarization, and spread;
modulating the signal in a fourth domain selected from the group consisting of phase, frequency, amplitude, polarization, and spread;
modulating the signal in a fifth domain selected from the group consisting of phase, frequency, amplitude, polarization and spread; and
transmitting the modulated signal,
wherein modulating the signal in the first domain, modulating the signal in the second domain, modulating the signal in the third domain, modulating the signal in the fourth domain and modulating the signal in the fifth domain defines a five-dimensional orthogonal symbol constellation of hyperspheres, each hypersphere having 48 nearest neighbors, and
wherein the five-dimensional orthogonal symbol constellation includes an origin containing a center sphere characterized by zero power transmitted.

14. The method of claim 13, wherein each state of the five-dimensional orthogonal symbol constellation is assigned to a particular, distinct direct-sequence spreading code.

15. The method of claim 13, wherein the five-dimensional orthogonal symbol constellation provides a maximum symbol-to-error ratio for a given average signal power.

16. The method of claim 13, wherein wherein the five-dimensional orthogonal symbol constellation has a packing fraction of $\pi^2/15\sqrt{2}$.

17. The method of claim 13, wherein modulating the signal in the third domain includes a constant envelope technique.

18. A method, comprising;
receiving a signal;
demodulating the signal in a first domain selected from the group consisting of phase, frequency, amplitude, polarization and spread;
demodulating the signal in a second domain selected from the group consisting of phase, frequency, amplitude, polarization and spread; and
demodulating the signal in a third domain selected from the group consisting of phase, frequency, amplitude, polarization and spread,
wherein demodulating the signal in the first domain, demodulating the signal in the second domain and demodulating the signal in the third domain decodes a three dimensional orthogonal symbol constellation selected from the group consisting of face-centered cubic spheres and hexagonal close-packed spheres, each sphere having 12 nearest neighbors, and
wherein the three dimensional orthogonal symbol constellation includes an origin at {0,0,0} containing a center sphere used for counting purposes but not for energy determination.

19. The method of claim 18, wherein demodulating the signal in the first domain includes phase demodulation, demodulating the signal in the second domain includes amplitude demodulation and demodulating the signal in the third domain includes spread demodulation.

20. The method of claim 18, wherein demodulating the signal in the third domain includes a constant envelope technique.

21. The method of claim 18, wherein each state of the three dimensional orthogonal symbol constellation decodes to a particular, distinct direct-sequence spreading code.

22. The method of claim 18, wherein the three dimensional orthogonal symbol constellation decodes to provide a maximum symbol-to-error ratio for a given average signal power.

23. The method of claim 18, wherein the three dimensional orthogonal symbol constellation has a packing fraction of approximately 0.7405.

24. A method, comprising:
receiving a signal;
demodulating the signal in a first domain selected from the group consisting of phase, frequency, amplitude, polarization and spread;
demodulating the signal in a second domain selected from the group consisting of phase, frequency, amplitude, polarization and spread;
demodulating the signal in a third domain selected from the group consisting of phase, frequency, amplitude, polarization and spread; and
demodulating the signal in a fourth domain selected from the group consisting of phase, frequency, amplitude, polarization and spread,
wherein demodulating the signal in the first domain, demodulating the signal in the second domain, demodulating the signal in the third domain and demodulating the signal in the fourth domain decodes a four-dimensional orthogonal symbol constellation of face-centered cubic hyperspheres, each hypersphere having 24 nearest neighbors, and
wherein the four-dimensional orthogonal symbol constellation includes an origin containing a center sphere used for counting purposes but not for energy determination.

25. The method of claim 24, wherein each state of the four-dimensional orthogonal symbol constellation decodes to a particular, distinct direct-sequence spreading code.

26. The method of claim 24, wherein the four-dimensional orthogonal symbol constellation decodes to provide a maximum symbol-to-error ratio for a given average signal power.

27. The method of claim 24, wherein the four-dimensional orthogonal symbol constellation has a packing fraction of $\pi^2/16$.

28. The method of claim 24, wherein demodulating the signal in the third domain includes a constant envelope technique.

29. The method of claim 24, wherein the four-dimensional orthogonal modulating symbol constellation includes mapping the four rectangular coordinates to four quadrature amplitudes, one pair on each of two orthogonal antennas, according to the equations:

$S_0 = a^2 = b^2$; $S_1 = S_0 \sin \psi \sin \phi \cos \theta$, $S_2 = S_0 \sin \psi \sin \phi \sin \theta$, $S_3 = S_0 S_0 \sin \psi \cos \theta$; and $S_4 = S_0 \cos \psi$, where $\{\psi \phi \theta\}$ are hyperspherical angles in accord with Poincaré spherical angles $\theta$ and $\phi$ in three dimensions.

30. A method, comprising:
receiving a signal;
demodulating the signal in a first domain selected from the group consisting of phase, frequency, amplitude, polarization and spread;
demodulating the signal in a second domain selected from the group consisting of phase, frequency, amplitude, polarization and spread;
demodulating the signal in a third domain selected from the group consisting of phase, frequency, amplitude, polarization and spread;
demodulating the signal in a fourth domain selected from the group consisting of phase, frequency, amplitude, polarization and spread; and
demodulating the signal in a fifth domain selected from the group consisting of phase, frequency, amplitude, polarization and spread,
wherein demodulating the signal in the first domain, demodulating the signal in the second domain, demodulating the signal in the third domain, demodulating the signal in the fourth domain and demodulating the signal in the fifth domain decodes a five-dimensional orthogonal symbol constellation of hyperspheres, each hypersphere having 48 nearest neighbors, and
wherein the five-dimensional orthogonal symbol constellation includes an origin containing a center sphere used for counting purposes but not for energy determination.

31. The method of claim 30, wherein each state of the five-dimensional orthogonal symbol constellation decodes to a particular, distinct direct-sequence spreading code.

32. The method of claim 30, wherein the five-dimensional orthogonal symbol constellation decodes to provide a maximum symbol-to-error ratio for a given average signal power.

33. The method of claim 30, wherein the five-dimensional orthogonal symbol constellation has a packing fraction of $\pi^2/15\sqrt{2}$.

34. The method of claim 30, wherein demodulating the signal in the third domain includes a constant envelope technique.

* * * * *